(12) United States Patent
Tomita

(10) Patent No.: US 8,341,750 B2
(45) Date of Patent: Dec. 25, 2012

(54) DOCUMENT PROCESSING APPARATUS, DOCUMENT PROCESSING SYSTEM AND RECORDING MEDIUM

(75) Inventor: Atsushi Tomita, Toyohashi (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1008 days.

(21) Appl. No.: 11/369,849

(22) Filed: Mar. 8, 2006

(65) Prior Publication Data

US 2006/0285160 A1    Dec. 21, 2006

(30) Foreign Application Priority Data

Jun. 15, 2005    (JP) ................. 2005-175561

(51) Int. Cl.
G06F 7/04    (2006.01)
G06F 7/00    (2006.01)

(52) U.S. Cl. ......................... 726/26; 707/608

(58) Field of Classification Search .......... 726/26; 707/608

See application file for complete search history.

(56) References Cited

U.S. PATENT DOCUMENTS

| | | | | |
|---|---|---|---|---|
| 5,706,452 A * | 1/1998 | Ivanov | ............ | 715/751 |
| 6,065,044 A * | 5/2000 | Ogasawara | ............ | 709/207 |
| 6,385,655 B1 * | 5/2002 | Smith et al. | ............ | 709/232 |
| 6,987,580 B2 * | 1/2006 | Watanabe et al. | ............ | 358/1.15 |
| 7,146,367 B2 * | 12/2006 | Shutt | ............ | 709/217 |
| 7,237,114 B1 * | 6/2007 | Rosenberg | ............ | 713/176 |
| 7,559,030 B2 * | 7/2009 | Ryu | ............ | 715/752 |
| 2002/0010760 A1 * | 1/2002 | Armenta et al. | ............ | 709/219 |
| 2003/0093556 A1 * | 5/2003 | Yeung et al. | ............ | 709/238 |
| 2003/0115326 A1 * | 6/2003 | Verma et al. | ............ | 709/225 |
| 2003/0131069 A1 * | 7/2003 | Lucovsky et al. | ............ | 709/217 |
| 2003/0200234 A1 * | 10/2003 | Koppich et al. | ............ | 707/203 |
| 2003/0217034 A1 * | 11/2003 | Shutt | ............ | 707/1 |
| 2004/0039721 A1 * | 2/2004 | Tsuchiya | ............ | 707/1 |
| 2004/0111612 A1 * | 6/2004 | Choi et al. | ............ | 713/163 |

(Continued)

FOREIGN PATENT DOCUMENTS

EP    1 102 473 A2    5/2001

(Continued)

OTHER PUBLICATIONS

Notification of Reasons for Refusal.

(Continued)

*Primary Examiner* — Techane Gergiso
(74) *Attorney, Agent, or Firm* — Buchanan Ingersoll & Rooney PC

(57) ABSTRACT

A document processing apparatus provided with boxes for storing various information in a sorted manner, the boxes including at least a private box having a box function of allowing an access from a specific user and/or group, includes a notification portion. The notification portion is configured such that when a document is moved in or a new document is accumulated in the private box from a user or a group other than an owner of the private box, the fact that the document is moved in or the new document is accumulated in the private box from a user or a group other than the owner of the private box is notified to the owner of the private box and that when a document not accumulated by the owner is accumulated in the private box, the fact that the document not accumulated by the owner is accumulated in the private box is also notified to the owner.

21 Claims, 26 Drawing Sheets

U.S. PATENT DOCUMENTS

| | | | |
|---|---|---|---|
| 2004/0264811 A1* | 12/2004 | Yano et al. | 382/306 |
| 2005/0097173 A1* | 5/2005 | Johns et al. | 709/206 |
| 2005/0256909 A1* | 11/2005 | Aboulhosn et al. | 707/200 |
| 2006/0010097 A1* | 1/2006 | Hashimoto | 707/1 |
| 2006/0072144 A1* | 4/2006 | Dowling et al. | 358/1.15 |
| 2006/0282504 A1* | 12/2006 | Yoshioka et al. | 709/207 |

FOREIGN PATENT DOCUMENTS

| | | |
|---|---|---|
| JP | 8-102757 | 4/1996 |
| JP | 11-196206 | 7/1999 |
| JP | 11-239238 | 8/1999 |
| JP | 2001-211306 A | 8/2001 |
| JP | 2003-58678 | 2/2003 |
| JP | 2003-196443 A | 7/2003 |
| JP | 2004-140657 | 5/2004 |
| JP | 2005-25513 A | 1/2005 |
| JP | 2005-149228 | 6/2005 |

OTHER PUBLICATIONS

Notification of Reasons for Refusal, Nov. 13, 2007.

* cited by examiner

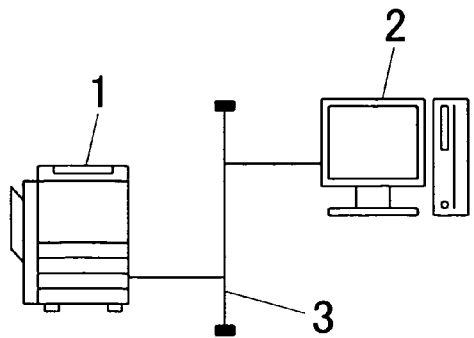
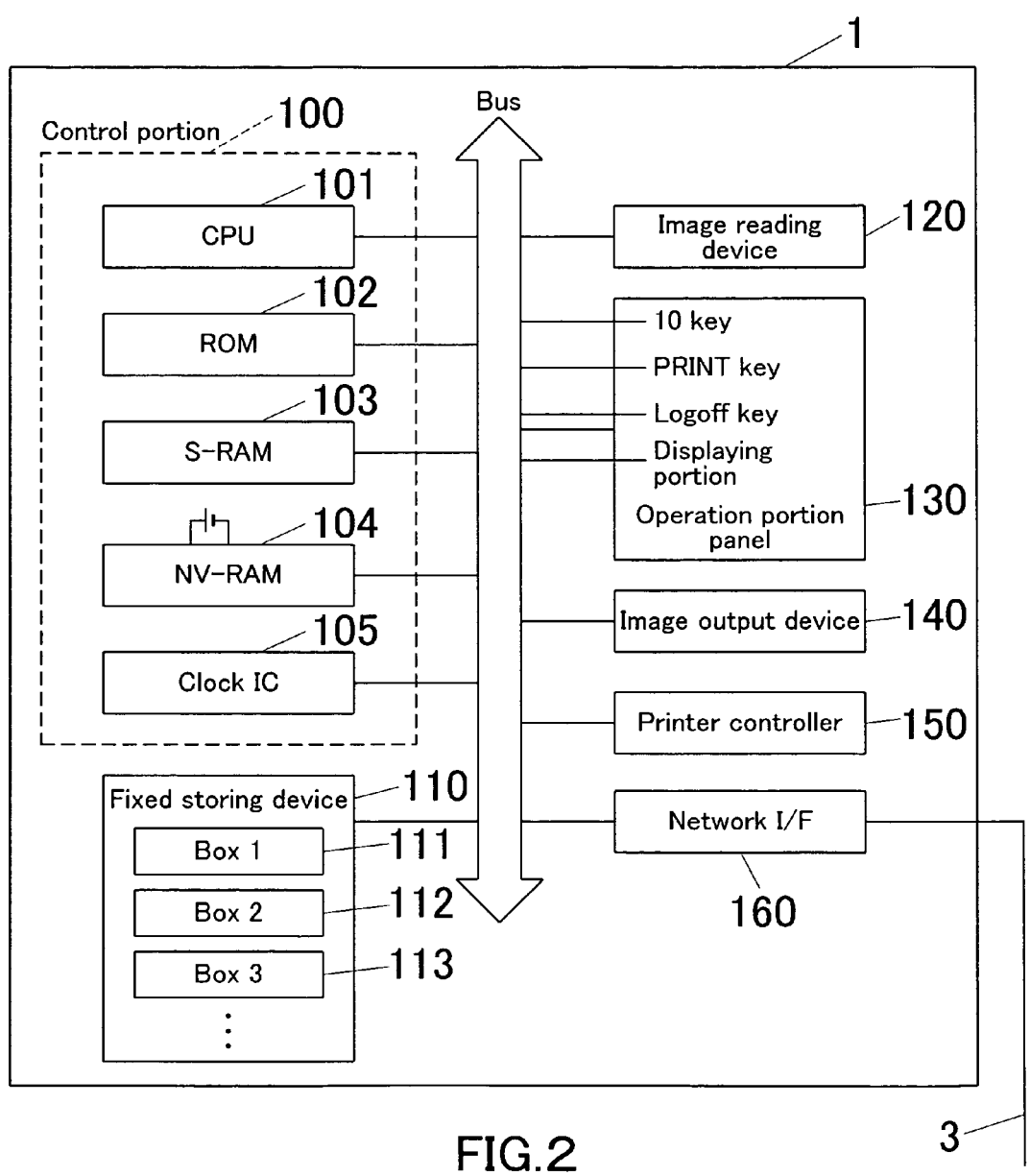
FIG.1
FIG.2

Setting of accumulation destination [OK] [Cancel]

List of boxes

| No. | Name |
|---|---|
| 1 | ito |
| 2 | aaa |
| 5 | katayama |
| 11 | uchiyama |
| 23 | abc |
| 25 | inoue |
| ⋮ | ⋮ |

[Circulation setting]

Setting of accumulation destination [OK] [Cancel]

List of boxes

| No. | Name |
|---|---|
| 1 | ito |
| 2 | aaa |
| 5 | katayama |
| 11 | uchiyama |
| 23 | abc |
| 25 | inoue |
| ⋮ | ⋮ |

Circulation destination boxes and circulation order

| No. | Name |
|---|---|
| 1 | ito |
| 23 | abc |
| 122 | ishikawa |

[Add→] [←Delete]

[↑ Up] [↓ Down] [Function restriction] [Mask]

FIG.7

| Function restriction | | OK | Cancel |
|---|---|---|---|
| Print: | Allowed | Prohibited | |
| Transmission: | Allowed | Prohibited | |

FIG.8

| Setting of mask region | | | OK | Cancel |
|---|---|---|---|---|

Document — Masking region

| | | Page | Start-End position |
|---|---|---|---|
| aaaaaaaaaaaaaaa | | 1 | 0-100 |
| bbbbbbbbbbbbbbbbbbbbbb | | 3 | 150-260 |
| ccccccccccccccc | Add→ | 3-10 | 0-260 |
| dddddddddddddddddddddddddddddd | | | |
| eeeeeeeeeeeeeeeeeeeeeeeeeeeee | ←Delete | | |
| fffffffffffffffffffffffffffffffffffffff | | | |
| gggggggggggggg | | | |
| hhhhhhhhhhhhhhhhhhhhhhhhhhhh | | | |
| iiiiiiiiiiiiiiiiiiiiiiiiiiiiiiiiiiiiiiiiiiii | | | |
| kkkkkkkkkkkkkkkkkkkkkkkkkkkkkk | | | |

FIG.9

Circulation administration list 1

Document No.: 1223

Circulation start date: 2004/7/3 10:13

| Box No. | Function restriction | | Masking region | Processing completion flag | Processing completion date and time |
|---|---|---|---|---|---|
| | Print | Transmission | | | |
| 1 | OK | NG | P1,0-150; P2,100-260; P3-9,0-260; | done | 2004/7/4 10:34 |
| 5 | OK | NG | P1,0-150; P2,100-260; P3-9,0-260; | done | 2004/7/5 13:34 |
| 13 | OK | NG | P1,0-150; P2,100-260; P3-9,0-260; | done | 2004/7/12 13:34 |
| 122 | OK | OK | P1,0-150; P2,100-260; P3-9,0-260; | | |
| 2255 | NG | OK | P1,0-150; P2,100-260; P3-9,0-260; | | |
| ⋮ | ⋮ | ⋮ | ⋮ | ⋮ | ⋮ |
| | | | | | |

FIG.10

| Circulation setting of accumulated document | OK | Cancel |

| List of boxes | | List of accumulated documents | |
|---|---|---|---|
| No. | Name | No. | Title |
| 1 | ito | 1101 | 20040605 Conference minute |
| 2 | aaa | 1102 | Project plan |
| 5 | katayama | 1103 | Operation manual |
| 11 | uchiyama | : | : |
| 23 | abc | | |
| 25 | inoue | | |
| : | : | | |

Circulation setting...

FIG.12

| Processing completion of circulation accumulated document | | | Close |
|---|---|---|---|
| List of boxes | | List of accumulated documents | |
| No. Name | | No. Title | |
| 1 | ito | 1101 20040605 Conference minute | |
| 2 | aaa | 1102 Project plan | |
| 5 | katayama | 1103 Operation manual | |
| 11 | uchiyama | : : | |
| 23 | abc | | |
| 25 | inoue | | |
| : | : | | Completion of processing |

FIG.15

Circulation administration list 2

Document No.: 1223

Circulation start date: 2004/7/3 10:13

| Image forming apparatus | Box No. | Function restriction | | Masking region | Processing completion flag | Processing completion date and time |
|---|---|---|---|---|---|---|
| | | Print | Transmission | | | |
| 10.192.168.1 | 1 | OK | NG | P1,0-150; P2,100-260; P3-9,0-260; | done | 2004/7/4 10:34 |
| 10.192.168.1 | 5 | OK | NG | P1,0-150; P2,100-260; P3-9,0-260; | done | 2004/7/5 13:34 |
| 10.192.168.2 | 13 | OK | NG | P1,0-150; P2,100-260; P3-9,0-260; | done | 2004/7/12 13:34 |
| 10.192.168.3 | 122 | OK | OK | P1,0-150; P2,100-260; P3-9,0-260; | | |
| 10.192.168.4 | 2255 | NG | OK | P1,0-150; P2,100-260; P3-9,0-260; | | |
| ⋮ | ⋮ | ⋮ | ⋮ | ⋮ | ⋮ | ⋮ |
| | | | | | | |

FIG.25

Circulation administration list 3

| Box No. | Document No. | Function restriction | | Masking region |
|---|---|---|---|---|
| | | Print | Transmission | |
| 1 | 43 | OK | NG | P1,0-150;<br>P2,100-260;<br>P3-9,0-260; |
| 5 | 35 | OK | NG | P1,0-150;<br>P2,100-260;<br>P3-9,0-260; |
| 13 | 1853 | OK | NG | P1,0-150;<br>P2,100-260;<br>P3-9,0-260; |
| 122 | 2218 | OK | OK | P1,0-150;<br>P2,100-260;<br>P3-9,0-260; |
| 2255 | 209 | NG | OK | P1,0-150;<br>P2,100-260;<br>P3-9,0-260; |
| ⋮ | ⋮ | ⋮ | ⋮ | ⋮ |
| | | | | |

FIG.27

DOCUMENT PROCESSING APPARATUS, DOCUMENT PROCESSING SYSTEM AND RECORDING MEDIUM

This application claims priority to Japanese Patent Application No. 2005-175561 filed on Jun. 15, 2005, the entire disclosure of which is incorporated herein by reference in its entirety.

BACKGROUND OF THE INVENTION

1. Field of the Invention

The present invention relates to a document processing apparatus having a box function capable of storing information such as image data in a sorted manner, a document processing system in which a plurality of document processing apparatuses having box functions and a server apparatus such as a print server are connected each other via a network to exchange various information, and a recording medium in which document processing program for making a computer execute document processing is recorded.

2. Description of the Related Art

The following description sets forth the inventor's knowledge of related art and problems therein and should not be construed as an admission of knowledge in the prior art.

A recently available image forming apparatus, as one of document processing apparatuses, has a function of once storing electronic data in a storing device such as a hard disk and then printing out the data at the timing specified by a user as well as a function of immediately printing out received print data or facsimile data.

Furthermore, in another image forming apparatus, the electronic data can be stored in divided storing regions called "box(s)" every user or every group.

As technique directed to such a box, Japanese Unexamined Laid-open Patent Publication No. H11-196206 discloses a facsimile apparatus having a function of sorting received facsimile information and distributing the received information to one of destination exclusive boxes which are divided every destination recognized from the information.

Furthermore, Japanese Unexamined Laid-open Patent Publication No. H11-239238 discloses another facsimile apparatus. In this apparatus, when the apparatus receives a confidential document, it stores the confidential document in a personal box of the confidential destination user and registers the storing destination of this confidential document in a Web server of itself. Thereafter, the apparatus notifies to the confidential destination user by email that it received the confidential document. When the confidential destination user who received the email accesses the facsimile apparatus from a personal computer and inputs the ID and the passwords, the linked destination to the confidential document is notified so that the user can see the confidential document.

Furthermore, as such a box technique, there further exists an image forming apparatus equipped with the so-called "private box" which is protected so as to allow an access of a specified user or group using a password. Moreover, there also exists an image forming apparatus equipped with two types of boxes, i.e., a private box and the so-called "public box" with no access limitation in view of the usability.

On the other hand, Japanese Unexamined Laid-open Patent Publication No. 2003-58678 discloses a document circulation system for circulating a document to previously specified plural destination terminals.

In the meantime, there is a possibility that a document is moved into a private box of the aforementioned image forming apparatus from a person other than the box owner.

However, even if the document was moved into the private box from a person other than the box owner, the owner of the private box could not recognize it until the owner confirms the stored contents of the private box. As a result, the processing of the document may be delayed, or a large number of moved documents may be accumulated in the private box without realizing them.

In the aforementioned document circulation system disclosed by Japanese Unexamined Laid-open Patent Publication No. 2003-58678, it is not a system utilizing private boxes of a document processing apparatus such as an image forming apparatus, but a system for passing on a document to destination terminals which are usually owned every user. Therefore, in the system, the user can quickly recognize that a document was moved in his/her terminal. However, in a system utilizing private boxes, the private boxes are allotted to a plurality of users sharing a single document processing apparatus, which tends to cause delayed document processing and/or accumulation of unprocessed documents as mentioned above.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The preferred embodiments of the present invention can significantly improve upon existing methods and/or apparatuses.

Among other potential advantages, some embodiments can provide a document processing apparatus by which, in cases where a document is moved to or newly accumulated in one of a plurality of boxes, especially private boxes, of the document processing apparatus, an owner of the private box can quickly recognize that the document is moved to or newly accumulated and an accumulation of a number of unprocessed documents can be prevented.

Among other potential advantages, some embodiments can provide a document processing system by which an owner of the private box can quickly recognize that the document is moved to or newly accumulated and an accumulation of a number of unprocessed documents can be prevented.

Among other potential advantages, some embodiments can provide a recording medium in which program for making a computer execute a document processing capable of making an owner of the private box quickly recognize that the document is moved to or newly accumulated and capable of preventing an accumulation of a number of unprocessed documents.

According to a first aspect of a preferred embodiment of the present invention, a document processing apparatus provided with boxes for storing various information in a sorted manner, the boxes including at least a private box having a box function of allowing an access from a specific user and/or group, the document processing apparatus, comprising:

a notification portion configured such that when a document is moved in or a new document is accumulated in the private box by a user or a group other than an owner of the private box, the fact that the document is moved in or the new document is accumulated in the private box by a user or a group other than the owner of the private box is notified to the owner of the private box and that when a document not accumulated by the owner is accumulated in the private box, the fact that the document not accumulated by the owner is accumulated in the private box is also notified to the owner.

According to a second aspect of a preferred embodiment of the present invention, a document processing system in which a plurality of document processing apparatuses provided with boxes for storing various information in a sorted manner, the boxes including at least a private box having a box function of allowing an access from a specific user and/or group, and a server apparatus are connected via a network to exchange various information, wherein the server apparatus is provided with a notification portion configured such that when a document is moved in or a new document is accumulated in the private box from a user or a group other than an owner of the private box, the fact that the document is moved in or the new document is accumulated in the private box by a user or a group other than the owner of the private box is notified to the owner of the private box and that when a document not accumulated by the owner is accumulated in the private box, the fact that the document not accumulated by the owner is accumulated in the private box is also notified to the owner.

According to a third aspect of a preferred embodiment of the present invention, a recording medium in which document processing program is stored for executing a computer of a document processing apparatus provided with boxes for storing various information in a sorted manner, the boxes including at least a private box having a box function of allowing an access from a specific user and/or group, wherein the program makes the computer execute:

a step of giving a notification that a document is moved in or a new document is accumulated in the private box by a user or a group other than an owner of the private box when the document is moved in or the new document is accumulated in the private box by a user or a group other than the owner of the private box, to the owner of the private box, and also a notification that a document not accumulated by the owner is accumulated in the private box when the document not accumulated by the owner is accumulated in the private box, to the owner of the private box.

According to a fourth aspect of a preferred embodiment of the present invention, a recording medium in which document processing program is stored for executing a computer of a server apparatus in a document processing system in which a plurality of document processing apparatuses provided with boxes for storing various information in a sorted manner, the boxes including at least a private box having a box function of allowing an access from a specific user and/or group, and the server apparatus are connected via a network to exchange various information, wherein the program makes the computer execute:

a step of giving a notification that a document is moved in or a new document is accumulated in the private box by a user or a group other than an owner of the private box when the document is moved in or the new document is accumulated in the private box by a user or a group other than the owner of the private box, to the owner of the private box, and also a notification that a document not accumulated by the owner is accumulated in the private box when the document not accumulated by the owner is accumulated in the private box, to the owner of the private box.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which:

FIG. 1 is a schematic view showing a structure of an image forming system equipped with an image forming apparatus as a document processing apparatus according to an embodiment of this invention;

FIG. 2 shows an internal structure of the image forming apparatus shown in FIG. 1;

FIG. 6 shows an example of an accumulation destination setting screen in the image forming apparatus;

FIG. 7 shows an example of a circulation destination setting screen in the image forming apparatus;

FIG. 8 shows an example of a function restriction setting screen in the image forming apparatus;

FIG. 9 shows an example of a mask setting screen in the image forming apparatus;

FIG. 10 is a table showing an example of a circulation administration list in the image forming apparatus;

FIG. 12 shows an example of a circulation setting screen of an accumulated document in the image forming apparatus;

FIG. 15 is an example of a processing completion screen of a circulation accumulated document in the image forming apparatus;

FIG. 25 is a table showing an example of a circulation administration list 2 in the server apparatus;

FIG. 27 is a table showing an example of a circulation administration list 3 in the image forming apparatus;

DETAILED DESCRIPTION OF THE PREFERRED EMBODIMENTS

Figure 3:
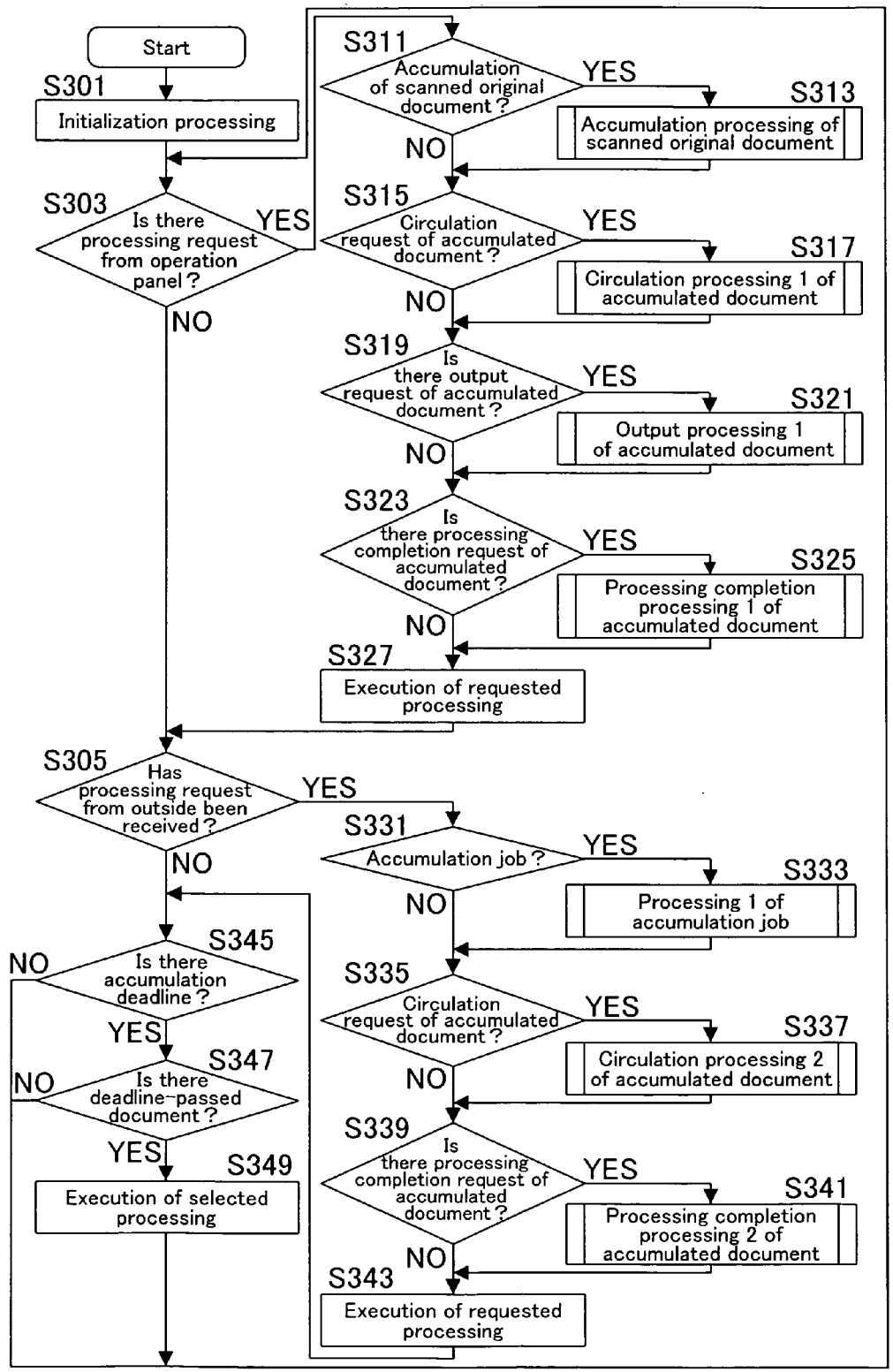
FIG. 3 is a flowchart showing an overall processing flow of the image forming apparatus.

In the following paragraphs, some preferred embodiments of the invention will be described by way of example and not limitation. It should be understood based on this disclosure that various other modifications can be made by those in the art based on these illustrated embodiments.

Initially, a first embodiment of this invention will be explained.

FIG. 1 is a structural explanatory view showing a system including an image forming apparatus which is a document processing apparatus according to a first embodiment of this invention.

This system is constituted by an image forming apparatus 1 and a terminal apparatus 2. The image forming apparatus 1 and the terminal apparatus 2 are connected with each other via a network 3.

The network 3 can be any one of networks including a network using a dedicated lines such as LANs (Local Area Networks), a network using public lines or a wireless network.

The image forming apparatus 1 is an apparatus for forming a scanned original document image and a copied image of an image created from print data transmitted from the terminal apparatus 2 on a paper. Furthermore, the apparatus 1 also has a function of transmitting a scanned original document image to the terminal apparatus 2 or another image forming apparatus via the network.

The terminal apparatus 2 is a normal computer equipped with a CPU, a RAM, a fixed storing device, a monitor, a keyboard, a mouse, etc. The terminal apparatus 2 creates print data in accordance with a user instruction and transmits the created print data to the image forming apparatus 1. Furthermore, the terminal apparatus 2 also has a function of exchanging various data with the image forming apparatus 1 via the network 3 and changing various settings by, for example, reading out various settings stored in the image forming apparatus 1, editing data in the terminal apparatus 2 and then sending back to the image forming apparatus.

FIG. 2 shows the internal structure of the image forming apparatus 1. To the CPU 101 of the image forming apparatus 1, a ROM 102 in which control program is stored, a working S-RAM (Static Random Access Memory) 103, a battery-backup NV-RAM 104 (nonvolatile memory) for storing various settings regarding image forming, and a clock IC 105 are connected via a bus. These components constitute a controller 100.

To the controller 100, an image reading device 120 for reading an original document, an operation panel 130 equipped with keys for performing various input operations and a display portion, a network interface 160 (hereinafter referred to as "network I/F") for exchanging various information among external apparatuses such as the terminal apparatus 2 connected via the network 3, a printer controller 150 for creating a copied image from the print data received via the network I/F 160, and an image outputting device 140 for forming a copied image on a paper, are connected via the bus.

To the controller 100, a fixed storing device 110 is connected via the bus. An example of the fixed storing device 110 is a hard disk device.

The fixed storing device 110 is provided with "boxes" 111, 112, 113 . . . , which are divided storing areas, and is capable of storing an original document image read by the image reading device 120, a copied image created from the print data transmitted from the terminal apparatus 2 and/or various information in the boxes as electronic data. The data stored in the boxes and various information can be printed out or transmitted to the terminal apparatus 2 via the network I/F 160.

The boxes 111, 112, 113 . . . can be classified into two types, i.e., a "public box" which does not limit an access to the accumulated documents and a "private box" which only allows an access to the documents by a specific user or user group. The private box is constituted so as to limit an access with a password for example. By allotting a password to a certain user or group, only the user or group is allowed to access the documents accumulated in the box.

The fixed storing device 110 can have one or more public boxes and one or more private boxes. Each box can be uniquely identified by a box number. A box name can be attached so that a user can easily identify the box.

Both in the public box and the private box, each box can accumulate one or more documents. To identify documents to be accumulated in the boxes, document numbers uniquely allotted over the boxes are given to the documents. Like the box numbers, document names can be attached.

The boxes 111, 112, 113 . . . are created through operations at the operation panel 130. At this time, a box number, a box name and a box type (i.e., public box or private box) are inputted via the operation panel 130 and then stored in the fixed storing device 110. In the case of a private box, a password is further inputted and stored in the fixed storing device 110.

Furthermore, the boxes can be deleted by the operation at the operation panel 130. Hereinafter, processing flow in the image forming apparatus will be explained.

[1-1] Overall Processing of the Image Forming Apparatus 1

Initially, the overall processing flow of the image forming apparatus 1 will be explained with reference to the flowchart shown in FIG. 3. This processing is executed by the operation of the CPU 101 in accordance with the program stored in the ROM 102.

The CPU 101 initiates the processing when the power is turned on. Initially, initialization processing such as a memory clear or standard mode settings is executed (Step S301).

Upon completion of the initialization processing, it is confirmed by operations of keys switches on the operation panel 130 or operations on the display portion whether any processing request (e.g., scanning and copying processing of an original document, various setting processing) was made by a user (Step S303). If there is no request (NO at Step S303), the routine proceeds to Step S305.

In cases where any processing request was made by a user (YES at Step S303), if it is accumulation processing of a scanned original document for accumulating the scanned original document in a box (YES at Step S311), the accumulation processing of the scanned original document is executed (Step S313). As for the accumulation processing of the scanned original document, the detailed explanation will be made later.

If the processing requested by the user is a circulation request of a document already accumulated in a box (YES at Step S315), circulation processing 1 of the accumulated document is executed (Step S317). The circulation processing 1 of the accumulated document will be detailed later.

If the request of the user is output processing of an accumulated document (YES at Step S319), output processing 1 of the accumulated document is executed (Step S321). The output of an accumulated document means printing of the accumulated document or transmitting of the accumulated document to an external device such as the terminal apparatus 2. The output processing 1 of the accumulated document will be detailed later.

If processing requested by a user is processing completion processing of an accumulated document (YES Step S323), processing completion processing 1 of the accumulated document is executed (Step S325). The processing completion processing 1 of the accumulated document will be detailed later.

If the processing requested by a user is another processing other than the above, the requested processing is executed (Step S327). The aforementioned another processing includes, for example, scanning and copying processing of an original document, changing processing of various settings stored in the NV-RAM 104.

Furthermore, the aforementioned processing includes setting of the document accumulation deadline 1, selection on which should have priority the accumulation deadline 1 or the accumulation deadline 2 of each circulation document, and selection of processing to be executed when a preferentially selected accumulation deadline has passed, in the image forming apparatus 1. The aforementioned processing to be executed when a preferentially selected accumulation deadline has passed includes processing of deleting an accumulated document, processing of giving a box owner a warning, and processing of performing forcible circulation to the next circulation destination.

As mentioned above, it is constituted so as to select which should have priority the accumulation deadline 1 common to all boxes of the image forming apparatus 1 or the accumulation deadline 2 set to a document to be circulated. This enlarges the freedom degree of accumulation deadline selection depending on the type of a circulation document or the utilization situation of the image forming apparatus. For example, it can be used in a manner such that the accumulation deadline of the entire apparatus is selected in most cases, but a circulation deadline longer than an accumulated document holding time of the entire apparatus is selected in cases where a document is circulated to be sequentially processed (to be added).

Upon completion of all of the processing requested by a user, the routine proceeds to Step S305.

At Step S305, it is checked whether any processing request (e, document print processing, various setting processing) was made from any external device such as the terminal device 2 via the network 3. If there is no processing request from any external device (NO at Step S305), the routine proceeds to Step S345.

In cases where there is any processing request from any external device (YES at Step S305), if it is an accumulation job for accumulating a document in a box (YES at S331), processing 1 for the accumulation job is executed (Step S333). The processing 1 for the accumulation job will be detailed later.

If the processing requested by an external device is a circulation request of a document which is already accumulated in a box (YES at Step S335), circulation processing 2 for the accumulated document is executed (Step S337). The circulation processing 2 for the accumulated document will be detailed later.

If the processing requested by an external device is processing completion processing of an accumulated document (YES at Step S339), processing completion processing 2 of the accumulated document is executed (Step S341). The processing completion processing 2 of the accumulated document will be detailed later.

If the processing requested by an external device is another processing other than any of the above (Step S343), the requested processing is executed (Step S343). The aforementioned another processing includes, for example, print processing of a document, processing of changing various settings stored in the NV-RAM 104.

Upon completion of all of the processing requested by an external device, the routine proceeds to Step S345, and it is discriminated whether an accumulation deadline is set by the processing of Step S327.

If any accumulation deadline is set (YES at Step 345), at Step S347, it is confirmed whether there exists any document whose accumulation deadline has passed. If there is any (YES at Step S347), the processing selected at Step S327, e.g., deletion of an accumulated document, warning to the box owner, forcible circulation to the next circulation destination, is executed (Step S349).

After the execution of the processing, the routine returns to Step S303 to repeat the aforementioned processing. It should be noted that the routine also returns to Step S303 even in cases where no accumulation deadline is set at Step S345 (NO at Step S345) or no document whose accumulation deadline has passed at Step S347 exists.

In this embodiment, as mentioned above, when an accumulation deadline of a document has passed, processing selected from previously determined processing is executed. Therefore, it can be effectively prevented that unprocessed document remains in a private box for a long time over the deadline.

[1-2] Accumulation Processing of Scanned Original Document

Figure 4:
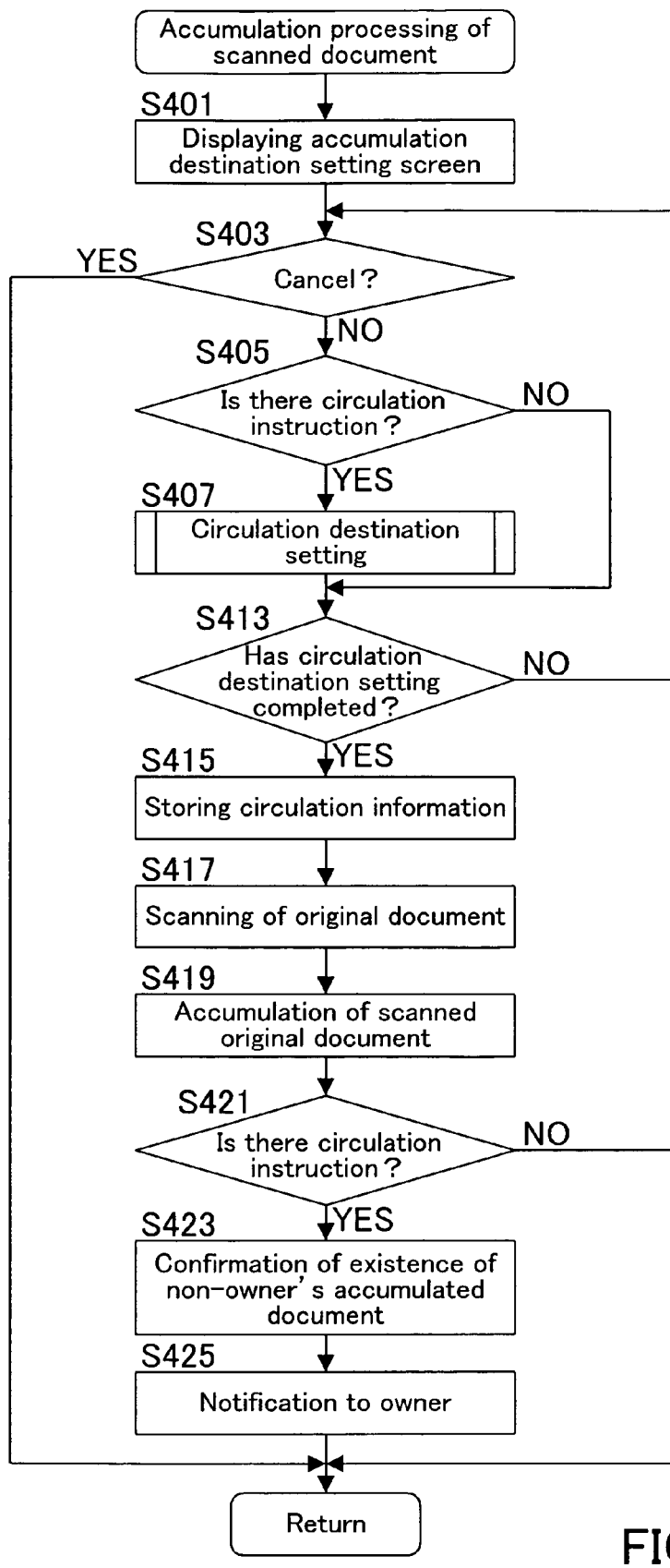
FIG. 4 is a flowchart showing accumulation processing of a scanned document to be performed by the image forming apparatus.
Figure 5:
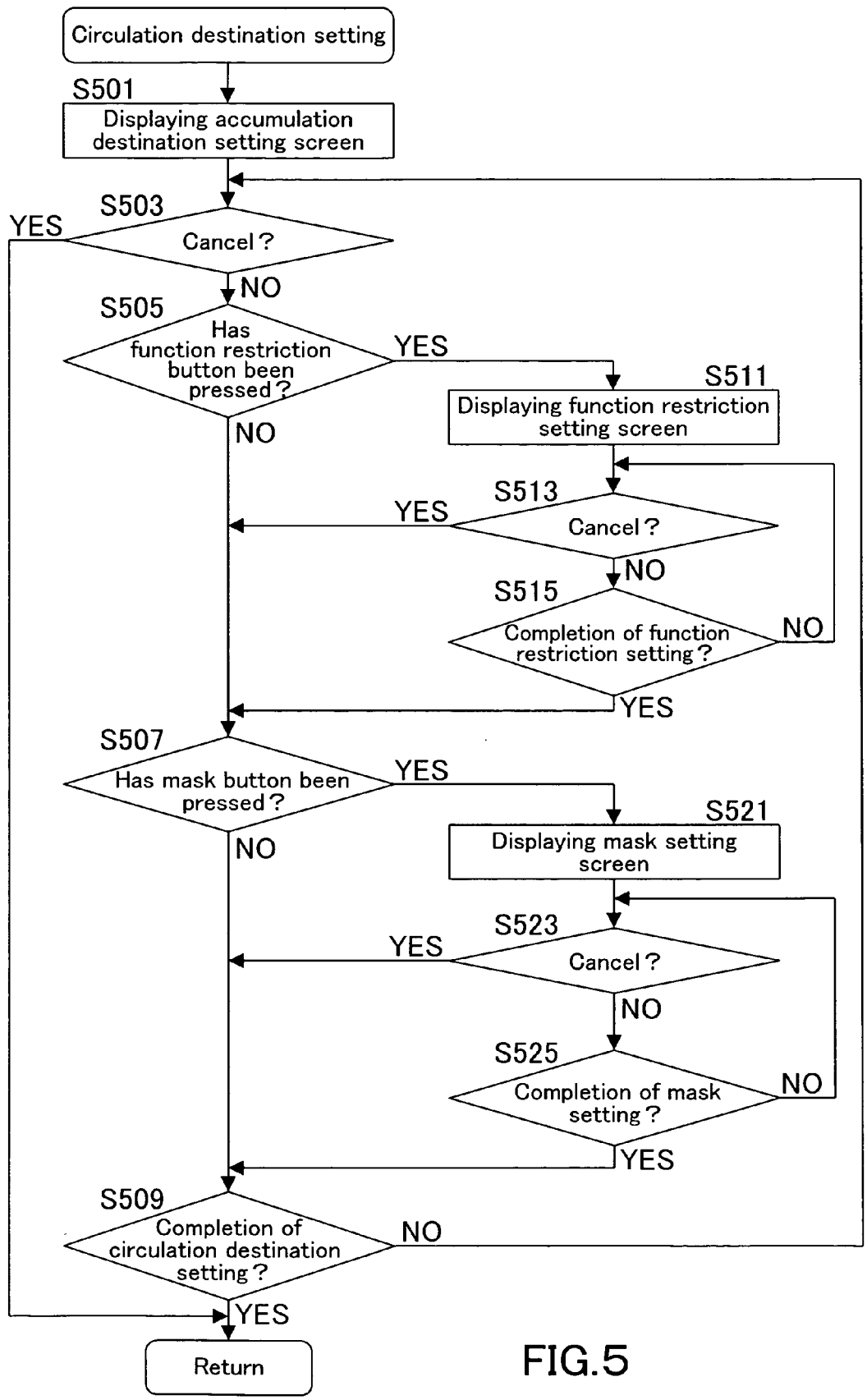
FIG. 5 is a flowchart showing circulation destination setting processing in the scanned document accumulation processing to be performed by the image forming apparatus.

Next, Step S313 in FIG. 3 (accumulation processing of a scanned original document) will be detailed based on the flowchart shown in FIGS. 4 and 5.

When accumulation processing of a scanned document is requested from the operation panel 130, the image forming apparatus 1 initially displays an accumulation destination setting screen for setting an accumulation of an original document operated on the operation panel 130 (Step S401).

FIG. 6 shows an example of an accumulation destination setting screen. In the accumulation destination setting screen, a list of boxes registered in the image forming apparatus 1 is displayed. A user selects one of accumulation destination boxes for accumulating a scanned original document from the list of the boxes. The shaded portion in the screen views shown in FIG. 6 and thereafter denotes a selected portion.

The accumulation destination setting screen includes an "OK" button and a "Cancel" button. The "OK" button is used to configure the setting of the accumulation destination to execute the accumulation processing of a scanned original document. On the other hand, the "Cancel" button is used to cancel accumulation processing of a scanned original document.

The "Circulation setting" button in the screen is used to configure various settings of circulation processing for circulating an accumulated scanned original document.

When the "Cancel" button is pressed on the accumulation destination setting screen (YES at Step S403), the accumulation processing of a scanned original document is cancelled and the processing is terminated. When the "Circulation setting" button is pressed (YES at Step S405), a circulation destination setting screen for setting a circulation is displayed on the operation panel 130 (Step S501 in FIG. 5) to perform various settings on circulation.

FIG. 7 shows an example of a circulation destination setting screen. This circulation destination setting screen displays a list of boxes registered in the image forming apparatus 1 (hereinafter, "registered box list") and a list of boxes selected as circulation destinations (hereinafter, "circulation destination box list"). When a box as a circulation destination is selected from the registered box list and then the "Add→" button is pressed, the selected box is added to the circulation destination and displayed in the circulation destination box list. To the contrary, when the "←Delete" button is pressed, the box selected in the circulation destination box list is deleted from the circulation destinations and also deleted from the circulation destination box list.

In the circulation destination box list, boxes selected as circulation destinations are displayed in order from above in accordance with the circulation order. When the "↑ Up" button is pressed, the box selected in the circulation destination box list is replaced with a button immediately listed above and the circulation order of the box goes up by one. To the contrary, when the "↓ Down" button is pressed, the box selected in the circulation destination box list is replaced with a button immediately listed below and the circulation order of the box goes down by one.

The "function restriction" button is used to configure the setting for restricting functions capable of executing to circulation documents accumulated in each box every circulation destination box.

Furthermore, the "Mask" button is used to specify the area to be masked in a document when the document accumulated in each box is to be outputted in each circulation destination box.

When the "Cancel" button is pressed in the circulation destination setting screen (YES at Step S503), the settings of the circulation destinations are cancelled.

When the "Function restriction" button on the circulation destination setting screen is pressed (YES at Step S505), a function restriction screen is displayed (Step S511). FIG. 8 shows an example of a function restriction screen. In this function restriction screen, it is configured that a user can select a permission or a prohibition on a print and a transmission of an accumulated document.

When the "Cancel" button on the function restriction screen is pressed (YES at Step S513), function restriction is cancelled and the function restriction screen is disappeared and returned to a circulation destination setting screen (routine proceeds to Step S507).

When the "OK" button on the function restriction screen is pressed (YES at Step S515), the function restriction is fixed and the function restriction screen is disappeared and returned to a circulation destination setting screen (the routine proceeds to Step S507).

Until the "OK" button or "Cancel" button is pressed, the function restriction screen is kept displayed.

When the "Mask" button on the circulation destination setting screen is pressed (YES at Step S507), a mask setting screen is displayed (Step S521).

FIG. 9 shows an example of a mask setting screen. The mask setting screen displays a document and a list of areas registered as mask areas. When an area to be masked is selected from the displayed document and the "Add→" button is pressed, the selected area is registered as a mask area, and the page number and the scope of the vertical axial positions in the page are displayed in the list of the mask area. To the contrary, when the "←Delete" button is pressed, the selected area in the list of the mask area is deleted from the list of the mask area and also deleted from the mask target.

When the "Cancel" button on the mask setting screen is pressed (YES at Step S523), the mask setting is cancelled and the mask setting screen is disappeared and returns to the circulation destination setting screen (the routine proceeds to Step S509).

When the "OK" button on the mask setting screen is pressed (YES at Step S525), the mask setting is fixed and the mask setting screen is disappeared and returns to the circulation destination setting screen (the routine proceeds to Step S509).

Until the "OK" button or the "Cancel" button is pressed, the mask setting screen is kept displayed.

When the "OK" button on the circulation destination setting screen is pressed (YES at Step S509), the setting of the circulation destination is fixed, and the circulation destination setting screen is disappeared and then returned to the accumulation destination setting screen (the routine proceeds to Step S413 in FIG. 4).

When the "OK" button on the accumulation destination setting screen is pressed (YES at Step S413), the circulation administration list 1 is stored in the fixed storing device 110 (Step S415). As the circulation administration list 1, the following information as the circulation destination information is stored every circulation destination in addition to the document number of a document to be circulated and the date and time when the circulation was initiated (circulation initiation date and time):

1) Box number of a circulation destination box
2) Executable functions
3) Information on mask area
4) Processing completion flag (flag showing whether the processing terminated)
5) Processing completion date and time (date and time when the processing terminated)

FIG. 10 shows an example of a circulation administration list 1. This circulation administration list 1 is created every document to be circulated.

As the circulation initiation date and time, the date and time when the "OK" button on the accumulation destination setting screen was pressed is stored. As the executable functions, permission/prohibition is set every function set on the function restriction screen. As the mask area information, information of mask area set on the mask setting screen is set in the form of, e.g., "Page range 1: initiation Y coordinate 1-completion Y coordinate 1; Page range 2: initiation Y coordinate 2-completion Y coordinate 2; . . . " The processing completion flag is a flag showing whether processing of a document has been completed at the circulation destination, which is set as "done" by processing completion processing of an accumulated document which will be explained later. In the initial condition, the flag is kept blank. In the same manner, as the processing completion date and time, the date and time when the processing was completed by the processing completion processing of an accumulated document which will be explained later is set. In the initial condition, the flag is kept blank.

Lastly, an original document is scanned with the original document reading device 120 (Step S417) and the scanned original document is accumulated in a box selected on the accumulation destination setting screen (Step S419).

Next, it is discriminated whether a circulation instruction is made, i.e., whether the accumulated document is a circulation document (Step S421). If it is discriminated that the accumulated document is a circulation document (YES at Step 421), it is confirmed that a document which is not accumulated by the private box owner himself/herself in the accumulation destination private box is accumulated (Step S423). Such confirmation can be performed by referring to the box administration information stored in the fixed storing device 110. Then, at Step S425, a notification is made to the owner of the private box by E-mail or the like to terminate the accumulation processing of the scanned original document. To the contrary, if it is discriminated that the accumulated document is not a circulation document (NO at Step S421), the processing terminates without making any notification.

The contents of notification are as follows. In cases where a document not accumulated by the owner of the private box himself/herself is not accumulated, the contents of notification are contents for notifying the accumulation of a circulation document. In cases where a document not accumulated by the owner of the private box himself/herself is accumulated, the contents of notification are the contents of both the fact and the accumulation of a circulation document. Examples of the aforementioned document not accumulated by the owner of the private box himself/herself include an accumulated document received via a communication portion such as facsimile or E-mail.

It can be constituted such that a list of documents which have not been used for a long time in an accumulated state (neither read nor printed) is notified simultaneously with a circulation notification.

A notification destination of a private box owner can be specified together with a designation of a circulation destination box at the time of a circulation instruction and stored in the circulation administration list 1 in connection with the box number.

As explained above, when a circulation document is accumulated in a private box, the fact is notified to the owner of the private box. Therefore, the owner of the private box can quickly recognize that a circulation document has been accumulated in his/her private box, which enables the owner to execute necessary processing of the document.

Furthermore, if a document not accumulated by the private box owner is accumulated in the private box, the fact is also notified. Accordingly, it can be prevented that a number of unprocessed documents unknowingly remain in the private box, which is convenient to the private box owner. Furthermore, there is no disadvantage that the unread documents decrease the storage region of the box.

When a user himself/herself accumulates a circulation document in his/her private box, a confirmation of an accumulated document by a person other than the owner (Step S421) and a notification to the owner (Step S421) can be omitted. Furthermore, in the embodiment, although it is constituted such that a notification is not made unless a circulation document is accumulated, it can be constituted such that a notification is made when a new document is accumulated regardless of whether it is a circulation document.

[1-3] Circulation Processing 1 of an Accumulated Document

Figure 11:
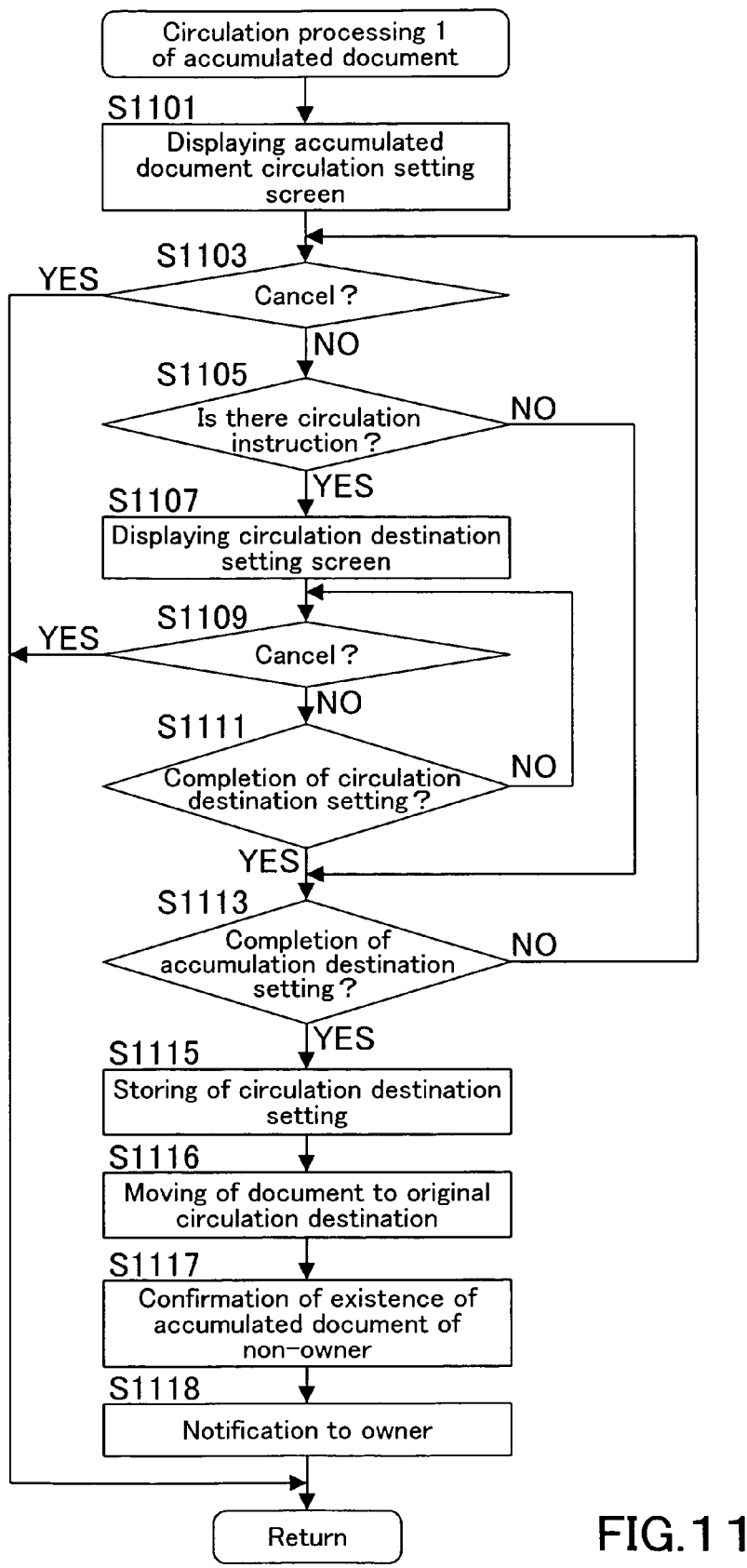
FIG. 11 is a flowchart showing circulation processing 1 of an accumulated document to be performed by the image forming apparatus.

Next, Step S317 in FIG. 3 (circulation processing 1 of an accumulated document) will be detailed based on the flowchart shown in FIG. 11.

The image forming apparatus 1 displays an accumulation document circulation setting screen on the operation panel 130 when an accumulation document circulation processing is requested by operations at the operation panel 130 (Step S1101).

FIG. 12 shows an example of an accumulated document circulation setting screen. This accumulated document circulation setting screen displays a list of boxes registered in the image forming apparatus 1 (hereinafter, "registered box list") and a list of documents accumulated in a box selected from the registered box list (hereinafter, "accumulated document list").

The accumulation document circulation setting screen is provided with an "OK" button and a "Cancel" button. The screen is kept displayed until either the "OK" button or the "Cancel" button is pressed. The "OK" button is configured to fix the circulation setting of an accumulated document and execute the circulation processing of the selected accumulation document. On the other hand, the "Cancel" button is configured to cancel the circulation processing of the accumulated document.

When the "Circulation setting" button on the circulation setting screen for accumulated documents is pressed, the aforementioned setting screen of a circulation destination is displayed, so that settings of circulation destinations can be performed. The setting screen of a circulation destination is the same as that shown in FIG. 7, and therefore the cumulative explanation will be omitted.

When the "Cancel" button on the circulation setting screen for accumulated documents is pressed (YES at Step S1103), the circulation processing for accumulated documents is cancelled, and the processing terminates.

When the "Circulation setting" button is pressed (YES at Step S1105), a circulation destination setting screen is displayed on the operation panel 130 (Step S1107) and various settings for circulation are performed.

When the "Cancel" button on the circulation destination setting screen is pressed (YES at Step S1109), the circulation processing for accumulated documents is cancelled, and the processing terminates.

When the "OK" button on the circulation destination setting screen is pressed (YES at Step S1111), the circulation destination setting screen is displayed on the operation panel 130. When the "OK" button on the accumulation destination setting screen is pressed (YES at Step S1113), the circulation administration list 1 is stored in the fixed storing device 110 (Step S1115) and then the routine proceeds to Step S1116. The circulation administration list 1 is the same as the circulation administration list 1 explained with reference to FIG. 10, and therefore cumulative explanation will be omitted. As the document number of a document to be circulated, the document number of the document selected on the circulation setting screen for accumulated documents is set.

Next, at Step S1116, the circulation document is moved to the private box of the first circulation destination in the circulation destination list 1, and then it is confirmed whether a document not accumulated by the private box owner itself is accumulated in the private box (Step S1117). Then, at Step S1118, a notification is made to the owner of the private box via E-mail or the like.

The contents of notification are as follows. In cases where a document not accumulated by the owner of the private box itself is not accumulated, the contents of notification are contents for notifying that a circulation document is moved. In cases where a document not accumulated by the owner of the private box itself is accumulated, the contents of notification are the contents of both the fact and the movement of a circulation document. Examples of the aforementioned document not accumulated by the owner of the private box itself include an accumulated document received via a communication portion such as facsimile or E-mail.

It can be constituted such that a list of documents which have not been used for a long time in an accumulated state (neither read nor printed) is notified simultaneously with a circulation notification.

A notification destination of a private box owner can be specified together with a designation of a circulation destination box at the time of a circulation instruction and stored in the circulation administration list 1 in connection with the box number.

As explained above, when a circulation document is moved into a private box, the fact is notified to the owner of the private box. Therefore, the owner of the private box can quickly recognize that a circulation document has been moved into his/her private box, which enables the owner to execute necessary processing of the document.

Furthermore, if a document not accumulated by the private box owner is accumulated in the private box, the fact is also notified. Accordingly, it can be prevented that a number of unprocessed documents unknowingly remain in the private box, which is convenient to the private box owner. Furthermore, there is no disadvantage that the unread documents decrease the storage region of the box.

[1-4] Output Processing 1 of an Accumulated Document

Figure 13:
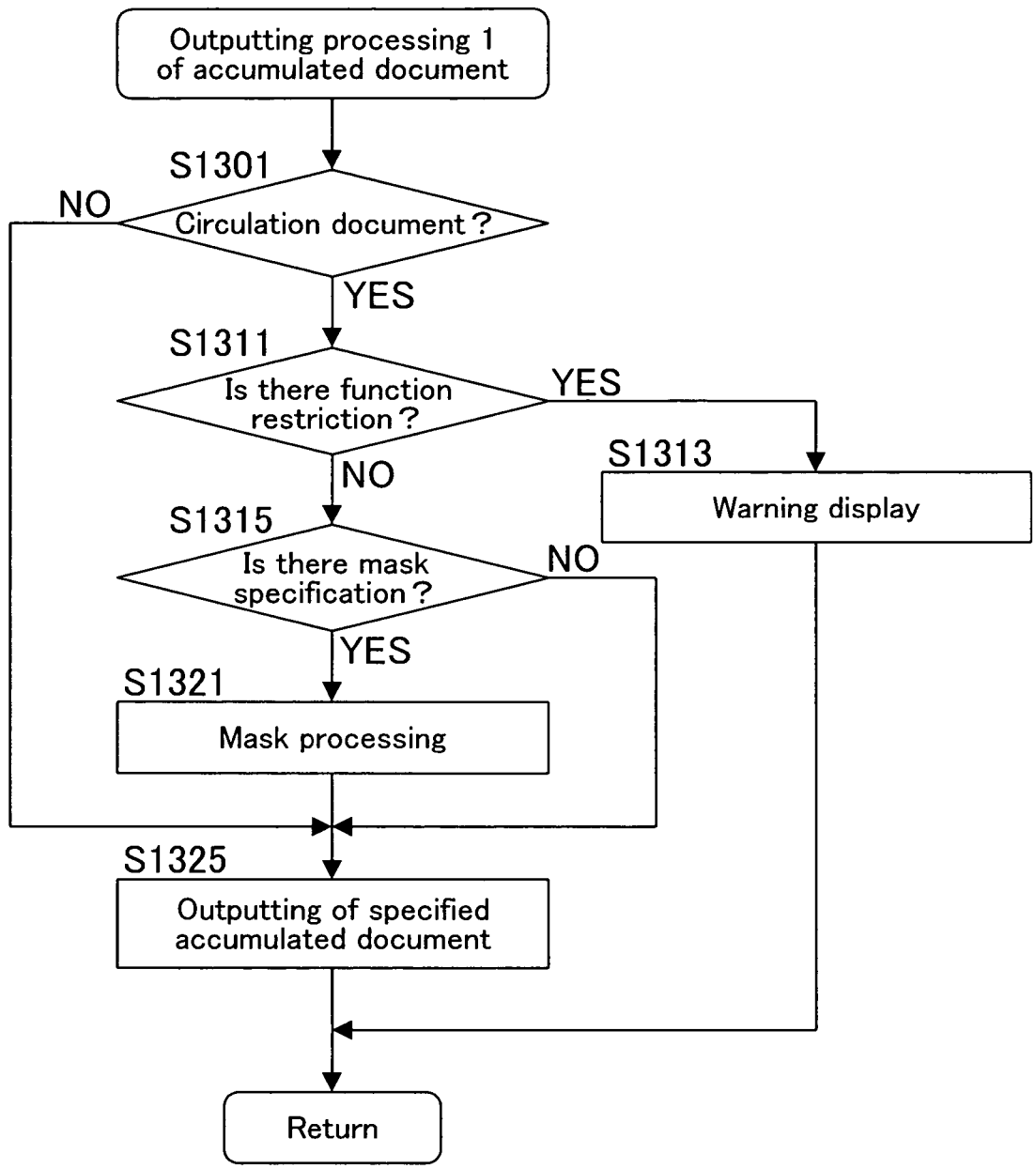
FIG. 13 is a flowchart showing output processing of an accumulated document in the image forming apparatus.

Next, Step S321 in FIG. 3 (output processing 1 of an accumulated document) will be detailed based on the flowchart shown in FIG. 13.

When output processing of an accumulated document is requested, a user specifies an accumulated document to be outputted by manipulating the operation panel 130.

If the specified accumulated document is a normal accumulated document which is not a circulation document (NO at Step S1301), the specified accumulated document is outputted (Step S1325), and the output processing of the accumulated document terminates.

Whether the specified accumulated document is a circulation document is discriminated based on whether the circulation administration list 1 in which the document number of the specified accumulated document is written is stored in the fixed storing device 110.

If the specified document is a circulation document (YES at Step S1301), by referring to the "function restriction" section in the circulation administration list 1, it is confirmed whether the output function to be executed is allowed (Step S1311). If the execution of the output function to be executed is prohibited (YES at Step S1311), a warning that the execution of the specified function is prohibited is displayed on the operation panel 130 (Step S1313), and the output processing of the accumulated document terminates.

If the execution of the function to be executed is allowed (NO at Step S1311), by referring to the "Mask area" of the circulation administration list 1, it is confirmed whether the mask area is specified (Step S1315). If the mask area is specified (YES at Step S1315), the specified mask area is masked (Step S1321). This masking processing is processing of marking out a specified area or replacing with a prescribed mark such as an asterisk "*."

Thereafter, the masked accumulated document is printed or transmitted to an external device (Step S1325).

As explained above, in this embodiment, function execution restriction or mask specification is performed every private box. Therefore, for example, in cases where a circular document is a highly-confidential document, the document can be circulated while keeping the security by changing the function restriction or the mask specification depending on the authority of the private box owner.

[1-5] Processing Completion Processing 1 of an Accumulated Document

Figure 14:
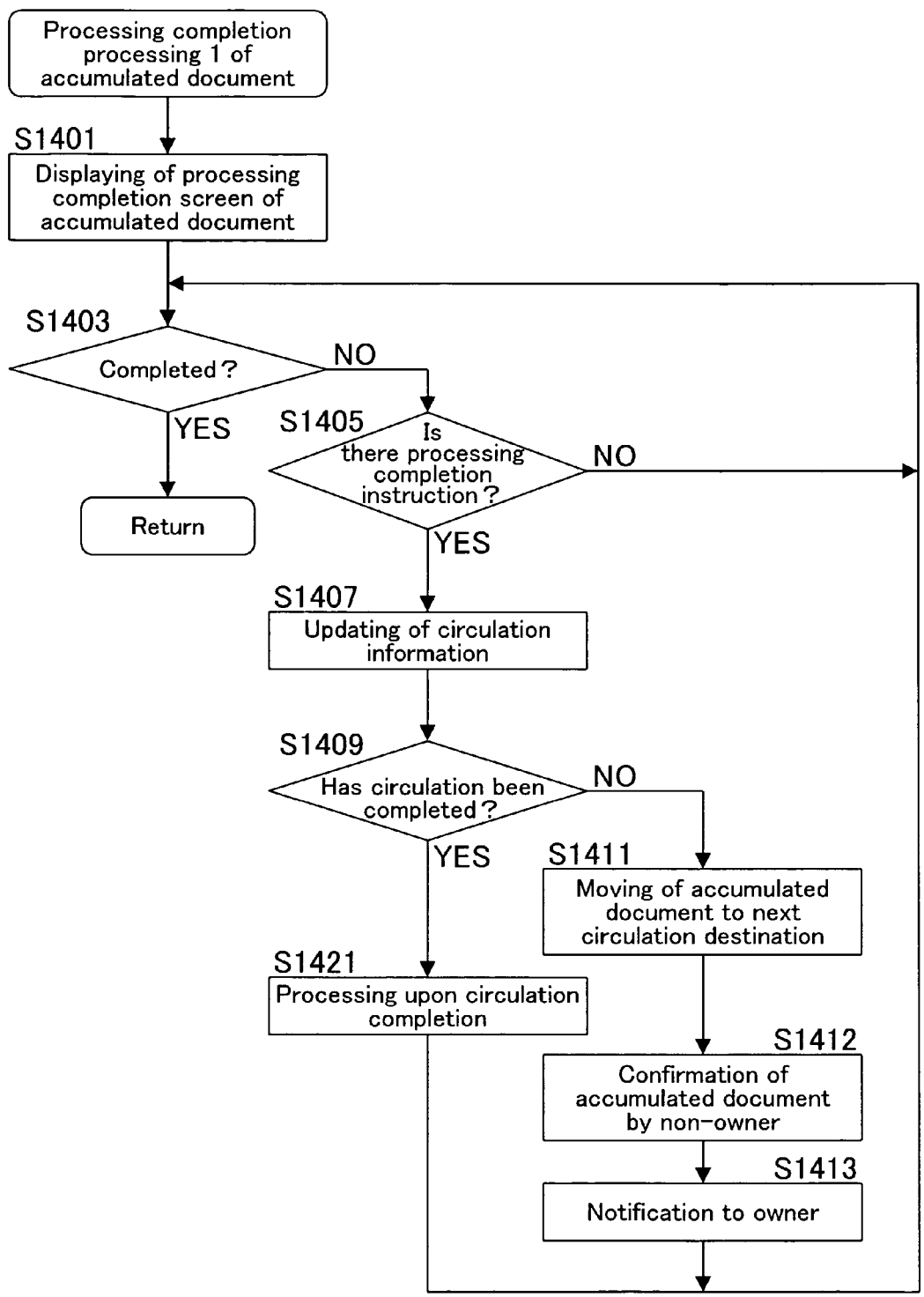
FIG. 14 is a flowchart showing processing completion processing of an accumulated document to be performed by the image forming apparatus.

Step S325 in FIG. 3 (Processing completion processing 1 of an accumulated document) will be detailed based on the flowchart shown in FIG. 14. This processing will be executed when an owner of a private box in which a circulation document is moved requests completion of processing of a circulation document for example.

When processing completion of an accumulated document is requested by the operation of the operation panel 130, a processing completion screen for circulation accumulated documents is displayed on the operation panel 130 (Step S1401).

FIG. 15 shows an example of a processing completion screen for a circulation accumulated document. The processing completion screen for a circulation accumulated document displays a list of boxes registered in the image forming apparatus 1 (hereinafter "registered box list") and a list of documents accumulated in the box selected from the registered box list (hereinafter "accumulated document list"). The processing completion screen for circulation accumulated documents is kept displayed until the "Close" button is pressed (YES at Step S1403).

The "processing completion" button is configured to instruct the completion of the processing for the accumulated document selected from the accumulated document list. However, the "processing completion" button is controlled such that the button can be pressed only when the accumulated document selected form the accumulated document list is a circulating document.

When the user processed the circulation document selects the circulation document by instructing his/her private box and presses the "processing completion" button (YES at Step S1405), it is discriminated that the processing is completed. Thus, "done" is set to the processing completion flag section in the circulation administration list 1, the data and time when the "processing completion" button was pressed are set to the "circulation completion date and time" (Step S1407).

Next, by referring to the circulation administration list 1, it is conformed whether there is a next circulation destination (Step S1409). If a next circulation destination exits (NO at Step S1409), the accumulated document is moved to the next circulation destination box (Step S1411). Then, it is confirmed whether a document not accumulated by the private box owner itself is accumulated in the private box (Step S1412). Thereafter, a notification is made to the owner of the private box by E-mail or the like (Step S1413).

In the same manner as mentioned earlier, the contents of the notification are as follows. In cases where a document not accumulated by the owner of the private box itself is not accumulated, the contents of the notification are contents for notifying that a circulation document is moved. In cases where a document not accumulated by the owner of the private box itself is accumulated, the contents of the notification are the contents of both the fact and the movement of a circulation document.

It can be constituted such that a list of documents which have not been used for a long time in an accumulated state (neither read nor printed) is notified simultaneously with a circulation notification.

Because of the notification to the private box owner, the owner can quickly recognize that a circulation document has been moved into his/her private box and/or that a document not accumulated by himself/herself is accumulated, which enables the owner to quickly execute necessary processing of the document.

On the other hand, if no further circulation destination exits (YES at Step S1409), processing at the time of circulation completion is executed (Step S1421). Examples of the processing at the time of circulation completion include deleting of an accumulated document and notifying of the circulation completion to a previously specified destination. This circulation completion processing can prevent that a circulation document remains untouched long time more than necessary.

[1-6] Processing 1 of an Accumulated Job

Figure 16:
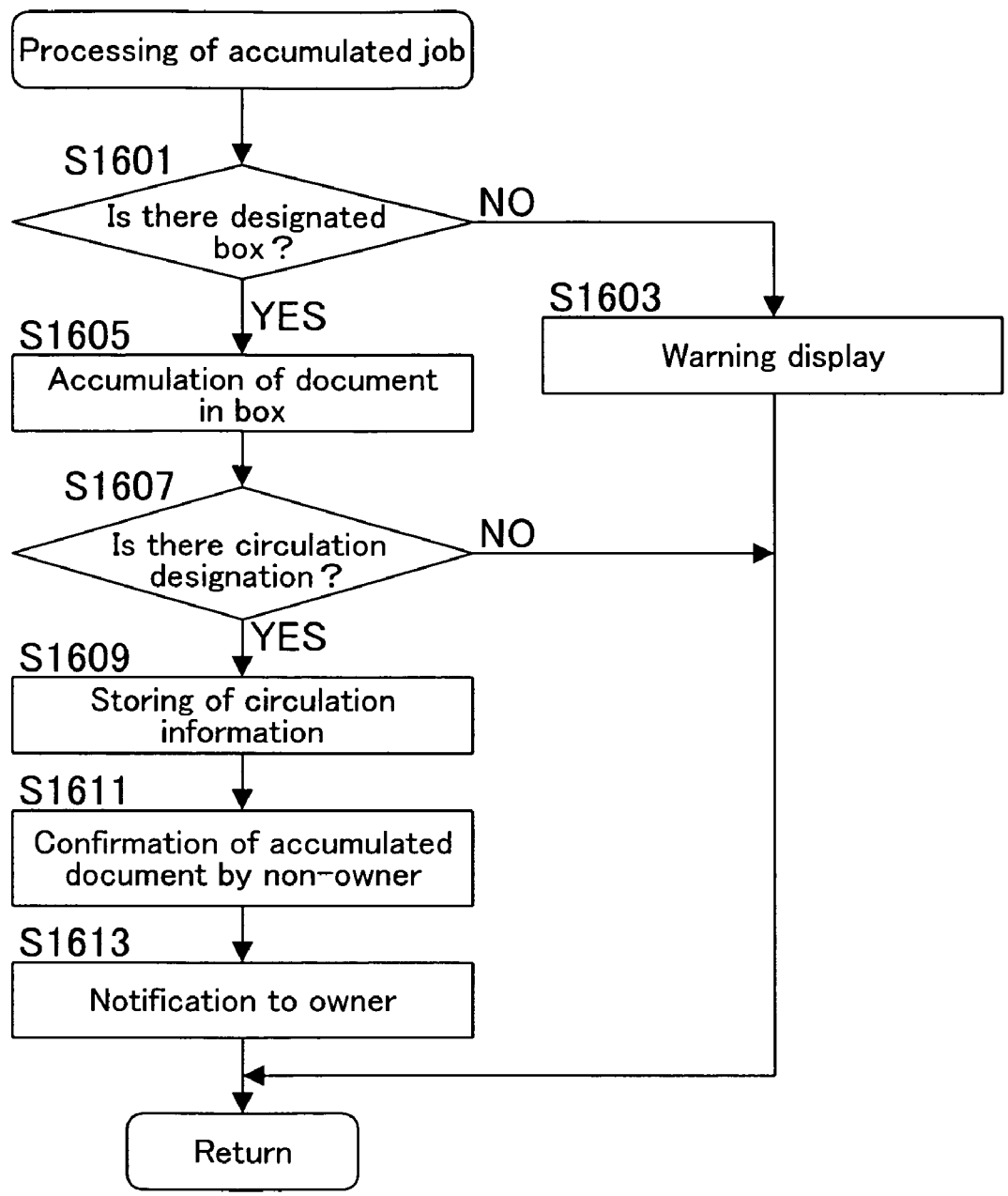
FIG. 16 is a flowchart showing accumulated job processing to be performed by the image forming apparatus.

Next, Step S333 in FIG. 3 (processing of an accumulated job 1) will be detailed based on the flowchart shown in FIG. 16.

Receiving an accumulated job from an external device such as the terminal device 2, the image forming apparatus 1 initially confirms whether there exists a specified box (Step S1601). If there exists no specified box, the fact is displayed on the operation panel 130 (Step S1603), and the processing of the accumulated job terminates.

In an accumulation job, in the same manner as a normal print for forming a copied image on a paper by transmitting a document from the terminal device 2 to the image forming apparatus 1, print data is transmitted from the terminal device 2 to the image forming apparatus 1.

However, in the case of an accumulation job, the fact that it is an accumulation job is written in the print data. At this time, the box number of the accumulation destination box for accumulating a document is simultaneously specified. This can be performed by specifying the accumulation job and the accumulation destination box number in the print data, e.g., "@PJL SET STOREINBOX=ON" and "@PJL SET BOXTOSTORE=123," using PJL (Print Job Language) which is a popular language for controlling a print job.

If there exists a specified box (YES at Step S1601), image data created from print data is accumulated as an accumulated document in the specified box (Step S1605).

Next, it is confirmed whether the circulation of the accumulated document is specified (Step S1607). If the circulation is not specified (NO at Step 1607), the accumulation job processing terminates.

The designation of the circulation of the document to be accumulated is performed by writing PJL by the number of circulation destination boxes in the form of ["Box number, OK/NG of function execution (print), OK/NG (transmission), mask area"](["mask area" can designate a plurality of areas in the form of [page designation, initiation Y coordinate-completion Y coordinate]) in the print data, e.g., [@ PJL SET BOXTOCIRCULATE1="1344, OK, NG, P1, 0-150, P2, 100-260, P3-P9, 0-260"], [@ PJL SET BOXTOCIRCULATE2="1506, OK, NG, P1, 0-150, P2, 100-260, P3-P9, 0-260"].

In cases where the circulation of the accumulated document is specified (YES at Step S1607), the circulation administration list 1 is stored in the fixed storing device 110 (Step S1609). The circulation administration list 1 is the same as the circulation administration list 1 explained with FIG. 10, and therefore the cumulative explanation is omitted here. As the circulation initiation date and time, the current date and time are set.

Next, it is confirmed whether a document not accumulated by the owner of the private box is accumulated in the private box (Step S1611). Then, a notification is made to the owner of the private box by email, etc., (Step S1613), and the processing terminates.

In the same manner as mentioned earlier the contents of the notification are as follows. In cases where a document not accumulated by the owner of the private box itself is not accumulated, the contents of the notification are contents for notifying that a circulation document is moved. In cases where a document not accumulated by the owner of the private box itself is accumulated, the contents of the notification are the contents of both the fact and the movement of a circulation document.

It can be constituted such that a list of documents which have not been used for a long time in an accumulated state (neither read nor printed) is notified simultaneously with a circulation notification.

Because of the notification to the private box owner the owner can quickly recognize that a circulation document has been moved into his/her private box and/or that a document not accumulated by himself/herself is accumulated, which enables the owner to quickly execute necessary processing of the document.

[1-7] Circulation Processing 2 of an Accumulated Document

Figure 17:
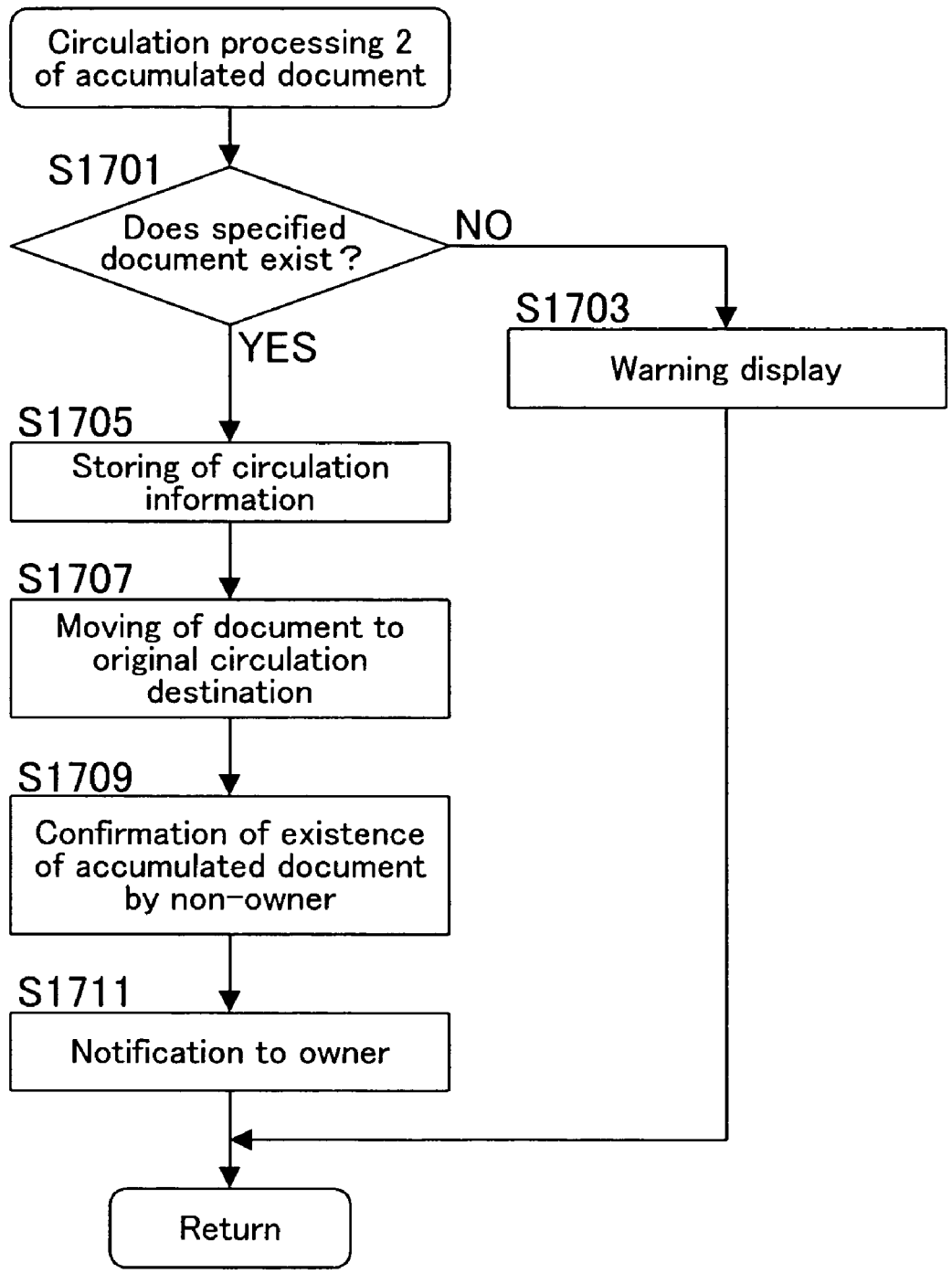
FIG. 17 is a flowchart showing circulation processing 2 of an accumulated document to be performed by the image forming apparatus.

Next, Step S337 in FIG. 3 (the circulation processing 2 of an accumulated document) will be detailed based on the flowchart shown in FIG. 17.

The terminal device 2 obtains a list of all boxes registered in the image forming apparatus 1 (hereinafter, "registered box list") from the image forming apparatus 1 and displays it on the monitor. It further obtains a list of all documents accumulated in boxes selected from the registered box list (hereinafter, "accumulated document list"), and displays it on the monitor. The user operating the terminal device 2 selects documents to be circulated from the accumulated document list and also selects at least one circulation destination box to which the document is to be circulated from the registered box list.

Based on the user's operation, the terminal device 2 transmits the print data including only the below PJL to the image forming apparatus 1.

---

%- 12345X@PJL
@PJL SET CIRCULATEDOCUMENT = ON
@PJO SET DOCUMENTTOCIRCULATE = "123, 1001"
@PJL SET BOXTOCIRCULATE1 = "1344, OK, NG, P1, 0 – 150, P2, 100 – 260, P3 – P9, 0 – 260"
@PJL SET BOXTOCIRCULATE2 = "1506, OK, NG, P1, 0–150, P2, 100 – 260, P3 – P9, 0 – 260"
@PJL SET BOXTOCIRCULATE3 = "1506, OK, NG, P1, 0–150, P2, 100 – 260, P3 – P9, 0 – 260"
%- 12345X

---

[@PJL SET CIRCULATEDOCUMENT=ON] specifies that a document already accumulated is to be circulated. [@PJO SET DOCUMENTTOCIRCULATE="123, 1001"] specifies an accumulated document to be circuited in the form of "box number, document number." The specifying of ["@P3L SET BOXTOCIRCULATEx=" (x=1, 2, 3)] is the same as that of the aforementioned processing 1 of an accumulation job, and therefore the cumulative explanation will be omitted here.

The image forming apparatus 1 discriminates whether the document of the specified document number exists in the box of the specified box number when it receives the aforementioned print data (Step S1701). If no specified document exits (NO at Step S1701), the apparatus 1 displays a warning on the operation panel 130 (Step S1703), and then this circulation processing terminates.

If there exists the specified document (YES at Step S1701), the circulation administration list 1 is stored in the fixed storing device 110 (Step S1709), and then the routine proceeds to Step S1707. The circulation administration list 1 is the same as the circulation administration list 1 explained with FIG. 10, and therefore the cumulative explanation will be omitted here. As the document number, the document number specified by [@PJL SET DOCUMENTTOCIRCULATE="123, 1001"] is set. As the circulation initiation date and time, the current date and time are set.

At Step S1707, the circulation document is moved to a private box which is the first listed circulation destination in the circulation destination list 1 (Step S1707). Then, it is confirmed that a document not accumulated by the owner of the private box himself/herself in the private box is accumulated (Step S1709). Then, a notice is given to the owner of the private box with an email, or the like (Step S1711), and the processing terminates.

In the same manner as mentioned earlier, the contents of the notification are as follows. In cases where a document not accumulated by the owner of the private box itself is not accumulated, the contents of the notification are contents for notifying that a circulation document is moved. In cases where a document not accumulated by the owner of the private box itself is accumulated, the contents of the notification are the contents of both the fact and the movement of a circulation document.

It can be constituted such that a list of documents which have not been used for a long time in an accumulated state (neither read nor printed) is notified simultaneously with a circulation notification.

[1-8] Completion Processing 2 of an Accumulated Document

Figure 18:
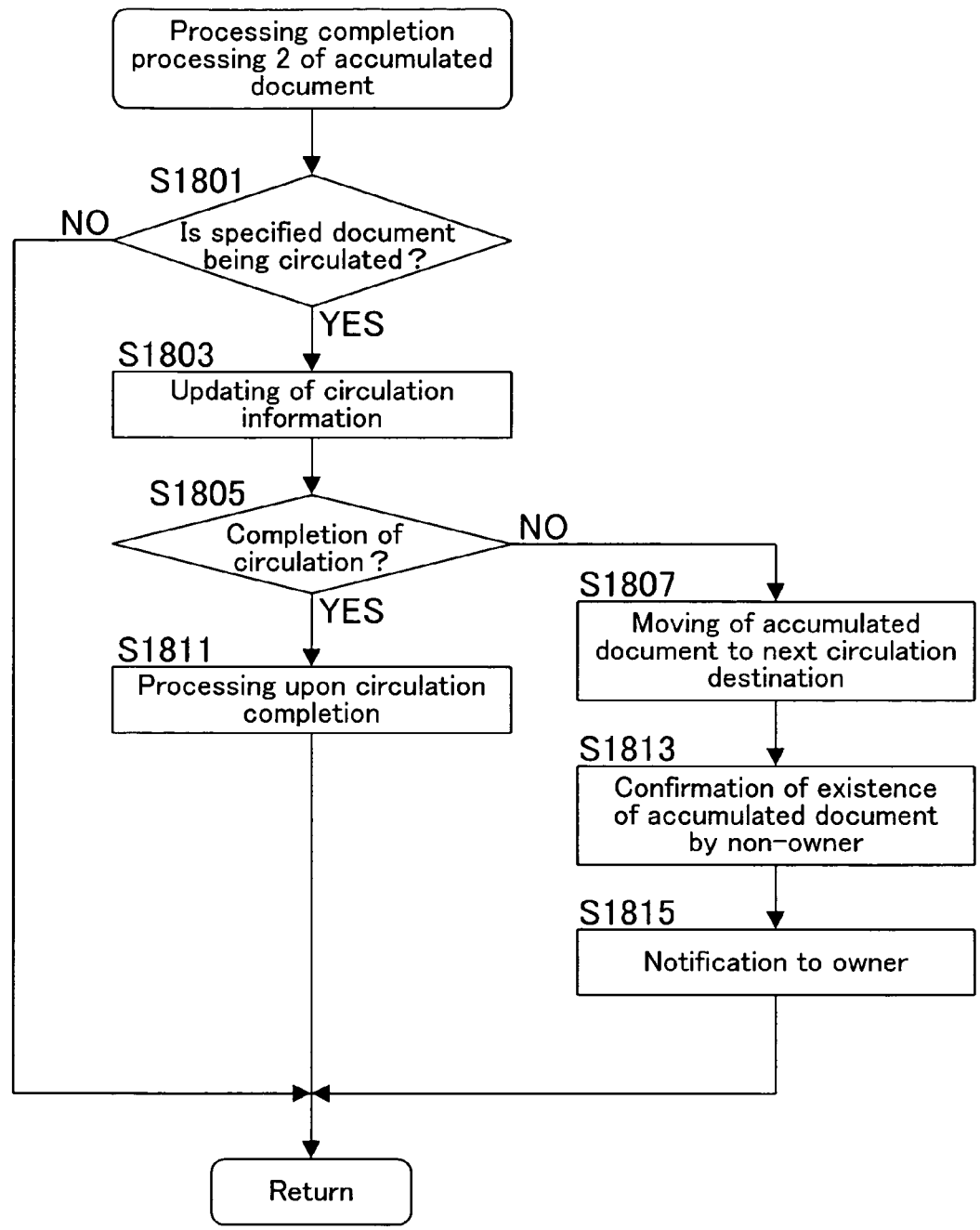
FIG. 18 is a flowchart showing processing completion processing 2 of an accumulated document to be performed by the image forming apparatus.

Next, Step S341 in FIG. 3 (completion processing 2 of an accumulated document) will be detailed based on the flowchart shown in FIG. 18.

The terminal device 2 obtains a list of all boxes registered in the image forming apparatus 1 (hereinafter, "registered box list") from the image forming apparatus 1, and displays it on the monitor. Furthermore, it obtains a list of all documents which are in circulation (hereinafter, "accumulated document-in-circulation list") among all documents accumulated in the box selected from the registered box list, and displays it on the monitor. A user operating the terminal device 2 selects a document that circulation is to be terminated from the accumulated document-in-circulation list.

Based on the user's operation, the terminal device 2 transmits print data including only the following PJL.

```
% - 12345@PJL
@PJL SET ENDOFPROCESSING = "123, 1001"
% - 12345X
```

[@PJL SET ENDOFPROCESSING="123, 1001"], specifies the accumulated document whose processing is to be completed in the form of "box number, document number."

Receiving the print data, the image forming apparatus 1 discriminates whether the specified document is being circulated (Step S1801). If the specified document is not a document which is being circulated (NO at Step S1801), this processing terminates.

If the specified document is a document which is being circulated (YES at Step 1801), the circulation administration list 1 is updated (Step S1803). That is, "done" is set in the processing completion flag section of the circulation administration list 1, and the date and time when the print data was received are set in the "circulation completion date and time" section.

Next, it is discriminated whether there exists a next circulation destination by referring the circulation administration list 1 (Step S1805). If there is a next circulation destination (NO at Step S1805), the accumulated document is moved to the next circulation destination box (Step S1807). Then, it is discriminated whether a document not accumulated by the owner of the private box is accumulated (Step S1813). Thereafter, a notice is given to the owner of the private box with an email or the like (Step S1815).

In the same manner as mentioned earlier, the contents of the notification are as follows. In cases where a document not accumulated by the owner of the private box itself is not accumulated, the contents of the notification are contents for notifying that a circulation document is moved. In cases where a document not accumulated by the owner of the private box itself is accumulated, the contents of the notification are the contents of both the fact and the movement of a circulation document.

It can be constituted such that a list of documents which have not been used for a long time in an accumulated state (neither read nor printed) is notified simultaneously with a circulation notification.

On the other hand, if no further circulation destination exists (YES at Step S1805), processing upon circulation completion is executed (Step S1811). This processing upon circulation completion includes, e.g., deletion of accumulated documents and notification of circulation to a previously specified destination. Such processing upon circulation completion can prevent circulation documents from being left for a long time beyond necessity.

As explained above, in the image forming apparatus according to the embodiment 1, when it is discriminated that a document obtained by scanning an original document, a document already accumulated in the private box, a document received from an external terminal device, or a document accumulated in the private box specified by an external terminal is moved to the specified private box and that the processing of the document is completed, this document is moved to the next circulation destination private box.

Thus, a circulation document is circulated in the specified order. Therefore, it becomes possible to circulate one document in order to finish the document while editing, which is very convenient.

Furthermore, when a document is moved to a circulation destination private box, a notice of the circulation is given to the private box owner. Therefore, the private box owner can recognize that a circulation document is moved to his/her private box immediately. This enables the private box owner to execute necessary processing and circulate it to the next circulation destination, which shortens the time required for the document circulation.

In addition to the notice of the circulation, in cases where a document not accumulated by the owner of the private box by himself/herself is accumulated, the fact is also notified to the owner, which also facilitates quick processing required to the document.

Furthermore, since it is constituted that a document is circulated using private boxes, it becomes possible to secure the security during the circulation. Furthermore, since the circulation order is administered in the image forming apparatus, no delay from a certain circulation destination to the next circulation destination would occur.

Embodiment 2

Hereinafter, a second embodiment of this invention will be explained.

Figure 19:
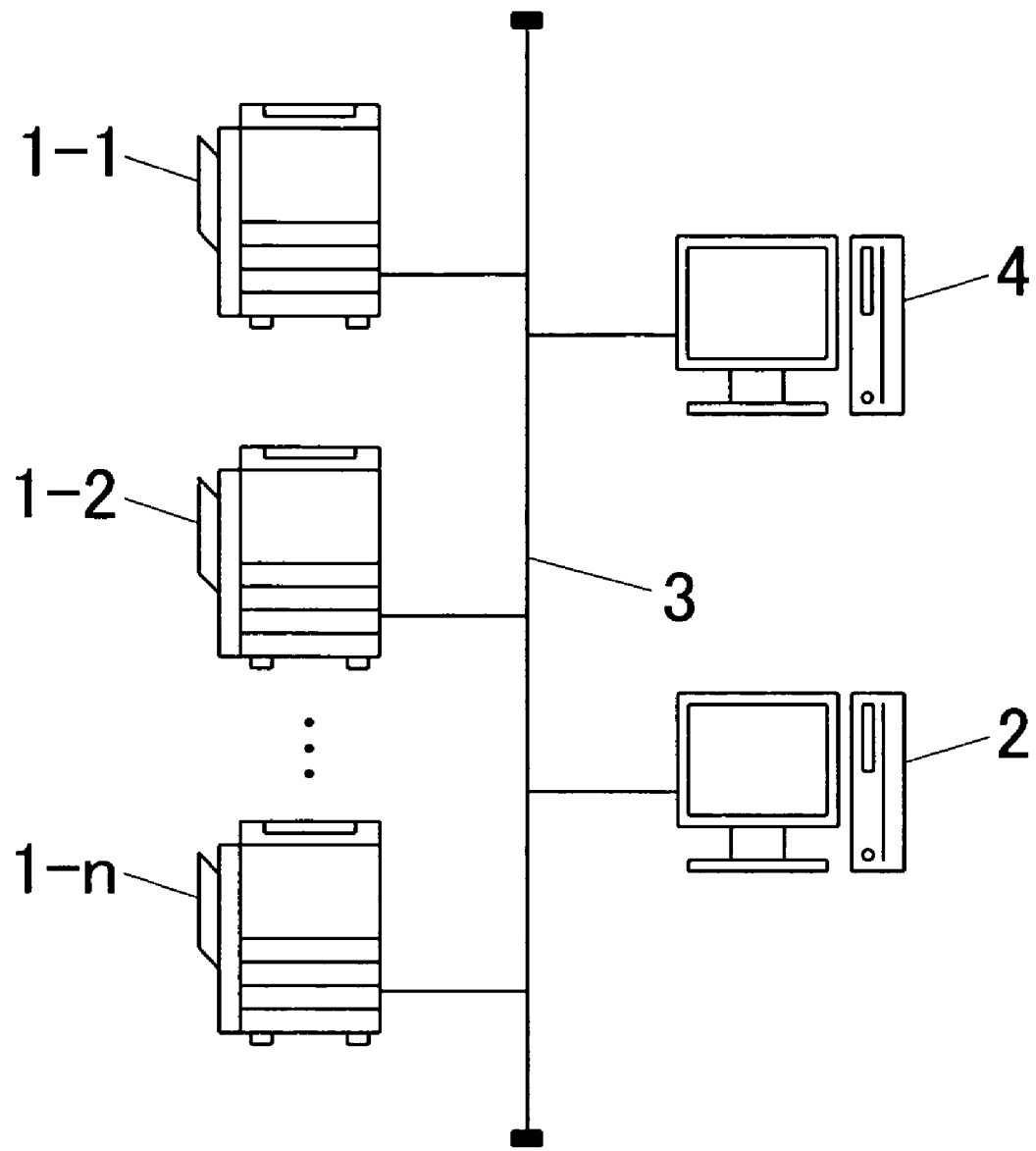
FIG. 19 is a schematic view showing a structure of a document processing system according to another embodiment of this invention.

FIG. 19 is a structural explanatory view showing an image forming system according to a second embodiment of this invention.

This system includes a plurality of image forming apparatuses 1-x (x:1-n), a terminal apparatus 2, and a server apparatus 4. The plurality of image forming apparatuses 1-x (x:1-n), the terminal apparatus 2 and the server apparatus 4 are connected via a network 3.

The network 3 can be any one of networks including a network using a dedicated lines such as LANs (Local Area Networks), a network using public lines or a wireless network.

The image forming apparatus 1-x(x:1-n) is an apparatus for forming a scanned original document image and a copied image of an image created from print data transmitted from the terminal apparatus 2 on a paper. Furthermore, the apparatus 1 also has a function of transmitting a scanned original document image to the terminal apparatus 2 or another image forming apparatus via the network.

The terminal apparatus 2 is a normal computer equipped with a CPU, a RAM, a fixed storing device, a monitor, a keyboard, a mouse, etc. The terminal apparatus 2 creates print data in accordance with a user instruction and transmits the created print data to the image forming apparatus 1.

The server apparatus 4 is a normal computer equipped with a CPU, a RAM, a fixed storing device, a monitor, a keyboard, a mouse, etc. The server apparatus 4 receives print date created by the terminal apparatus 2 and forwards the print data to specified an image forming apparatus 1-x(x:1-n).

Initially, an overall processing flow among the terminal apparatus 2, the server apparatus 4 and the image forming apparatuses 1-x(x:1-n) will be explained with reference to FIGS. 20 to 22.

Figure 20:
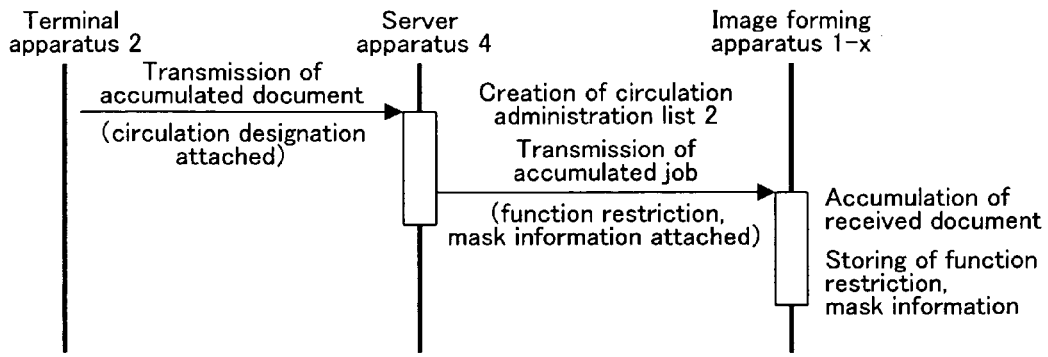
FIG. 20 shows a flow of accumulated job processing to be executed by a server apparatus in the system shown in FIG. 19.

1) Accumulated Job Processing (FIG. 20)

When a user instructs execution of an accumulated job at the terminal apparatus 2, the accumulated job is transmitted from the terminal apparatus 2 to the server apparatus 4. At this time, information accompanied by circulation specifications such as circulation destination boxes is simultaneously transmitted to the server apparatus 4.

The server apparatus 4 creates a circulation administration list 2 to administrate the circulation order, current circulation destination, etc., and transmits an accumulated job to the image forming apparatus 1-x(n:1-n). At this time, function restrictions specified to an accumulation destination box and information on mask regions at the time of outputting are simultaneously transmitted to the image forming apparatus 1-x(x:1-n).

The image forming apparatus 1-x(x:1-n) accumulates the received document in the specified box. It registers the information on function restrictions and the mask region at the time of outputting in the circulation administration list 3 to apply the information at the time of outputting the accumulated document.

Figure 21:
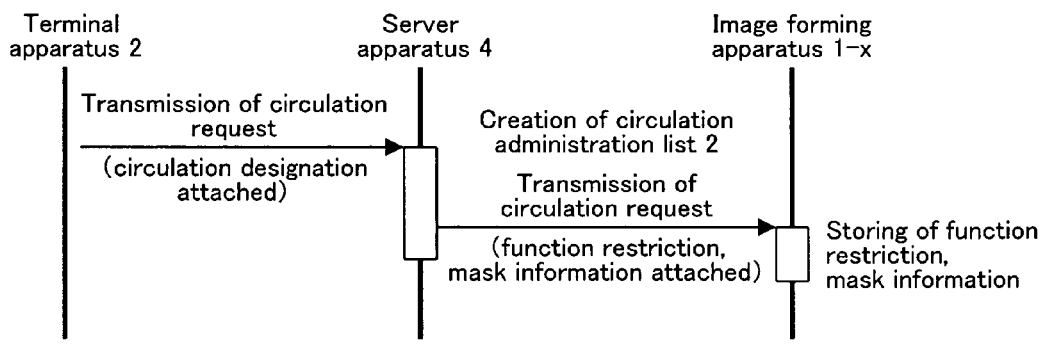
FIG. 21 shows a circulation processing flow of an accumulated document to be executed by the server apparatus.

2) Circulation Processing of Accumulated Document (FIG. 21)

When a user requests circulation of a document already accumulated in any one of the information forming apparatuses 1-x(x:1-n) at the terminal apparatus 2, a circulation request is transmitted from the terminal apparatus 2 to the server apparatus 4. At this time, the information related to circulation specification such as circulation destination boxes is simultaneously transmitted to the server apparatus 4.

The server apparatus 4 creates a circulation administration list 2 to administrate the circulation order, current circulation destination, etc., and transmits a circulation request to an image forming apparatus 1-x(n:1-n) of the first circulation order. At this time, information on function restrictions specified to a box in which a document is accumulated and mask regions at the time of outputting is simultaneously transmitted to the image forming apparatus 1-x(x:1-n).

The image forming apparatus 1-x(x:1-n) registers information on function restrictions transmitted at the time of the circulation request and the mask region at the time of outputting in the circulation administration list 3 to apply the information at the time of outputting the accumulated document.

Figure 22:
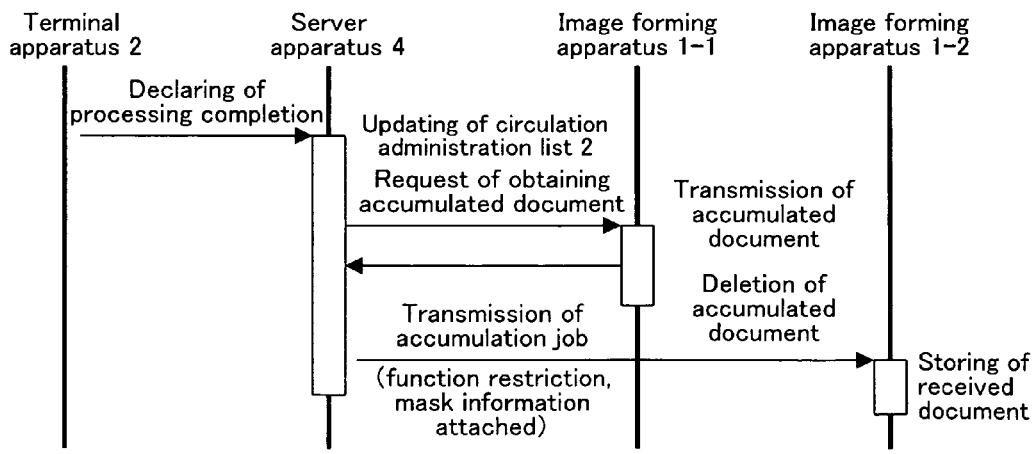
FIG. 22 shows processing completion processing flow of an accumulated document to be executed by the server apparatus.

3) Processing Completion Processing of Accumulated Document (FIG. 22).

When a user completed the processing of the circular document requests the processing completion of the accumulated document at the terminal apparatus 2, a processing completion request is transmitted to the server apparatus 4.

The server apparatus 4 refers to the circulation administration list 2, collects the accumulated document from the image forming apparatus 1-a in which the specified document is accumulated, and then transmits the accumulated document to the image forming apparatus 1-b which is the next circulation destination. Thereafter, the server apparatus 4 updates the circulation administration list 2.

In the image forming apparatus 1-a, the accumulated document and the information on function restrictions and/or mask regions are deleted from the circulation administration list 3. On the other hand, in the image forming apparatus 1-b, the received document is accumulated in the specified box. The information on function restrictions and/or mask regions at the time of outputting is stored in the circulation administration list 3 to apply these information at the time of outputting the accumulated document.

Hereinafter, the processing flow in the server apparatus 4 and the image forming apparatus 1-x(x:1-n) will de detailed using a flowchart.

[2-1] Overall Processing of the Server Apparatus 4

Initially, the overall processing flow of the server apparatus 4 will be explained with reference to the flowchart shown in FIG. 23. The CPU of the server apparatus 4 executes the processing in accordance with the program stored in ROM or the like.

In the server apparatus 4, the processing is initiated when the power is turned on. Initially, the initialization processing such as memory clear and normal mode setting is executed (Step S2301).

Upon completion of the initialization processing, it is checked whether any processing request (e.g., document print processing, various setting processing) was made from an external apparatus such as the terminal apparatus 2 via the network 3. This check will be repeated until the power is turned off or any processing is requested.

In cases where any processing request is made from an external apparatus (YES at Step S2303), if it is an accumulation job for accumulating a document in a box (YES at Step S2311), processing 2 of an accumulation job is executed (Step S2313). The processing 2 of an accumulation job will be detailed.

If the processing requested by an external apparatus is a circulation request of a document already accumulated in a box (YES at Step S2315), a circulation processing 3 of the accumulated document is executed (Step S2317). The circulation processing 3 of the accumulated document will be detailed.

If the processing requested by an external apparatus is a processing completion processing of an accumulated document (YES at Step S2319), processing completion processing 3 of an accumulated document is executed (Step S2321). The processing completion processing 3 of an accumulated document will be detailed.

If the processing requested by an external apparatus is the other processing other than document accumulation processing, accumulated document circulation request and processing completion processing of an accumulated document, the requested processing will be executed (Step S2323). The other processing mentioned above is print processing of a document, for example.

When the processing requested by an external apparatus is completed, the routine proceeds to Step S2303 to repeat the aforementioned processing.

[2-2] Processing 2 of an Accumulation Job

Next, Step S2313 in FIG. 23 (processing 2 of an accumulation job) will be detailed with reference to the flowchart shown in FIG. 24.

In cases where a job is transmitted from the terminal apparatus 2 to the image forming apparatus 1-$x$($x$:1-$n$) via the server apparatus 4, based on the document transmitted from the terminal apparatus 2 to the server apparatus 4, designation of an image forming apparatus for executing the job and the settings of the job, the print data is created at the server apparatus 4. The print data is transmitted to the designated image forming apparatus.

In the case of an accumulation job, the fact that it is an accumulation job is written in the print data to be transmitted from this server apparatus 4 to an image forming apparatus 1-$x$($x$:1-$n$). At this time, the box number of the accumulation destination box for accumulating a document is simultaneously specified. This can be performed by specifying the fact of the accumulation job and the accumulation destination box number in the print data, e.g., "@PJL SET STOREINBOX=ON" and "@PJL SET BOX-TOSTORE=123," using PJL (Print Job Language) which is a popular language for controlling a print job.

Receiving an accumulation job from the terminal apparatus 43, the server apparatus 4 confirms whether a list of a document to be accumulated is specified (Step S2401).

The designation of circulation of a document to be accumulated is performed in the form of ["IP address of image forming apparatus, Box number, OK/NG of function execution (print), OK/NG (transmission), mask area"](["mask area" can specify a plurality of areas in the form of [page designation, initiation Y coordinate-completion Y coordinate]] by the number of circulation destination boxes, e.g., [BOX TO CIRCULATE1="10. 192. 168. 1, 123, OK, NG, P1, 0-150, P2, 100-260, P3-P9, 0-260"], [BOX TO CIRCULATE2="10. 192. 168. 2, 1506, OK, NG, P1, 0-150, P2, 100-260, P3-P9, 0-260"] when setting a job.

If the circulation is not specified (NO at Step 2401), the document is transmitted to the designate image forming apparatus (Step S2403), and the processing terminates.

In cases where the circulation of the accumulated document is specified (YES at Step S2401), a circulation administration list 2 is created (Step S2411). The created circulation administration list 2 is stored in a fixed storing device.

FIG. 25 shows an example of a circulation administration list 2. This circulation administration list 2 is a list in which an IP address of an image forming apparatus having a circulation destination box is added to the circulation administration list 1 shown in FIG. 10. Since the circulation administration list 2 is the same as the circulation administration list 1 shown in FIG. 10 except for the IP address, the cumulative explanation will be omitted.

After creating the circulation administration list 2, the document is transmitted to the designated image forming apparatus (Step S2413). At this time, the information on the function restriction specified to the box for accumulating a document and the mask region is simultaneously transmitted to the image forming apparatus. At this time, the server apparatus 4 specifies the following PJL at the head portion of the print data.

```
% - 12345x@PJL
@PJL SET STOREINBOX = ON
@PJO SET BOXTOSTORE = 123
@PJL SET BOXDOCPROP = "OK, NG, P1, 0 – 150, P2, 100 – 260,
P3 – P9, 0 – 260"
:
:
```

[@PJL SET STOREINBOX=ON] denotes an accumulation job, [@PJO SET BOXTOSTORE=123] denotes the box number of the accumulation destination box. ["@PJL SET BOXDOCPROP= . . . ] is a PJL designation including function restrictions to the box of the first circulation order and the information of mask region.

Thereafter, the document number allotted to the document when the document is accumulated in a box is transmitted from an image forming apparatus. Receiving this document number, the server apparatus sets it to the document number of the circulation administration list 2 (Step S2415).

Next, it is confirmed whether a document not accumulated by the owner of the private box in which a document is accumulated is accumulated in the private box (Step S2417). Then, a notice is given to the owner of the private box by email or the like (Step S2419), and this processing terminates.

In the same manner as mentioned earlier, the contents of the notification are as follows. In cases where a document not accumulated by the owner of the private box itself is not accumulated, the contents of the notification are contents for notifying that a circulation document is moved. In cases where a document not accumulated by the owner of the private box itself is accumulated, the contents of the notification are the contents of both the fact and the movement of a circulation document. The notification destination can be designated simultaneously with the designation of the circulation destination box at the time of instructing a circulation and stored in the circulation administration list 2.

It can be constituted such that a list of documents which have not been used for a long time in an accumulated state (neither read nor printed) is notified simultaneously with a circulation notification.

Because of the notification to the private box owner, the owner can quickly recognize that a circulation document has been accumulated in his/her private box and/or that a document not accumulated by himself/herself is accumulated, which enables the owner to quickly execute necessary processing of the document.

The processing of the image forming apparatus 1-$x$(x:1-$n$) with respect to an accumulation job will be explained with reference to the flowchart shown in FIG. 26.

Receiving an accumulation job from the server apparatus 4, the image forming apparatus 1-$x$ (x:1-$n$) confirms whether there exists a designated box (Step S2601). If there is not designated box, the fact is displayed on the operation panel 130 (Step S2603), and this processing terminates. If there exists the designated box (YES at Step S2601), the image data created from the print data is accumulated in the designated box (Step S2605).

Next, it is confirmed whether circulation of the accumulated document is specified (Step S2607). If the circulation is not specified (NO at Step S2607), the processing of this accumulation job terminates. Whether the circulation is specified is discriminated whether PJL such as "@PJL SEST BOXDOCPROP="OK, NG, P1, 0-150, P2, 100-260, P3-P9, 0-260" in the print data of the accumulation job.

In cases where circulation of the accumulated document is specified (YES at Step S2607), the information of the aforementioned PJL is registered in the circulation administration list 3 (Step S2609). Thereafter, the document number of the accumulated document is transmitted to the server apparatus 4 (Step S2611), administration information for confirming whether a document accumulated by a person other than the box owner is accumulated in the designated box is transmitted to the server apparatus 4 (Step S2613), and this processing terminates.

FIG. 27 shows an example of the circulation administration list 3. In the circulation administration list 3, the following information is stored every document every circulation destination.

1) Document number of a document to be circulated
2) Box number of a circulation destination box
3) Executable function
4) Information on mask region

[2-3] Circulation Processing 3 of Accumulated Document

Figure 28:
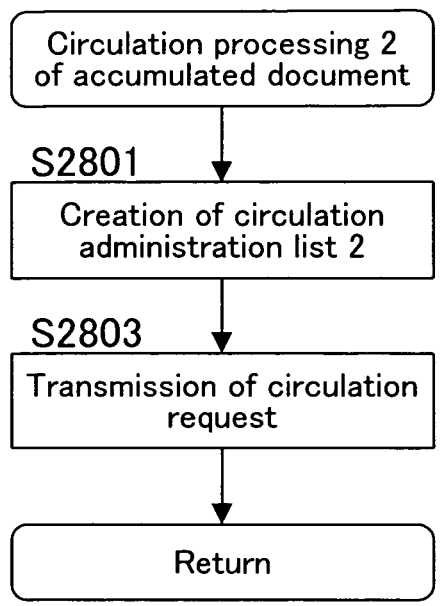
FIG. 28 is a flowchart showing circulation processing 2 of an accumulated document to be executed by the server apparatus.

Next, Step S2317 in FIG. 23 (circulation processing 3 of an accumulated document) will be detailed with reference to the flowchart shown in FIG. 28.

The terminal apparatus 2 obtains a list of all boxes registered in the image forming apparatus 1-$x$(x:1-$n$) (hereinafter, "registered box list") from the image forming apparatus 1-$x$ (x:1-$n$), and displays it on the monitor. Furthermore, it obtains the list of all documents accumulated in the box selected from the registered box list (hereinafter, "accumulated document list") and displays on the monitor. A user operating the terminal apparatus 2 selects a document to be circulated from the accumulated document list and selects at least one circulation destination box to which the document is circulated from the registered box list.

Based on the user's operation, the terminal device 2 transmits a circulation request including the below parameter designation to the server apparatus 4.

```
CIRCULATEDOCUMENT = ON
DOCUMENTTOCIRCULATE = "123, 1001"
BOXTOCIRCULATE1 = "10. 192. 168. 1, 123, OK, NG, P1, 0 – 150,
P2, 100 – 260, P3 – P9, 0 – 260"
BOXTOCIRCULATE2 = " 10. 192. 168. 1, 1506, OK, NG, P1, 0 – 150,
P2, 100 – 260, P3 – P9, 0 – 260"
```

-continued

```
BOXTOCIRCULATE3 = " 10. 192. 168. 2, 1506, OK, NG, P1, 0 – 150,
P2, 100 – 260, P3 – P9, 0 – 260"
```

[CIRCULATEDOCUMENT=ON] specifies that a document already accumulated is to be circulated. [DOCUMENTTOCIRCULATE="123, 1001"] specifies an accumulated document to be circuited in the form of "box number, document number." The designation of ["BOXTOCIRCULATEx=" (x=1, 2, 3)] is the same as that of the aforementioned processing 2 of an accumulation job, and therefore the cumulative explanation will be omitted here.

Receiving the print data, the server apparatus 4 creates a circulation administration list 2 (Step S2209), and this processing terminates. The circulation administration list 2 is the same as the circulation administration list 2 explained using FIG. 25, and therefore the cumulative explanation will be omitted here.

As the document number, the document number specified by [DOCUMENTTOCIRCULATE="123, 1001"] is set. As the circulation initiation date and time, the current date and time are set.

Next, the server apparatus 4 transmits the print data including only PJL corresponding to the parameter designation at the tome of requesting a circulation to the designated image forming apparatus 1-$x$(x:1-$n$).

```
%- 12345x@PJL
@PJL SET CIRCULATEDOCUMENT = ON
@PJO SET DOCUMENTTOCIRCULATE = "123, 1001"
@PJL SET BOXDOCPROP = "123, OK, NG, P1, 0 – 150, P2,
100 – 260, P3 – P9, 0 – 260"
%- 12345X
```

[@PJL SET CIRCULATEDOCUMENT=ON] denotes a circulate request of an accumulated document. [@PJL SET DOCUMENTTOCIRCULATE="123, 1001"] denotes the box number of the box in which a document to be circulated is accumulated, and the document number of the document. The designation of the ["@PJL SET BOXDOCPRIP= . . . "] is a PJL designation including function restrictions with respect to the box of the first circulation order and the information of mask region.

Figure 29:
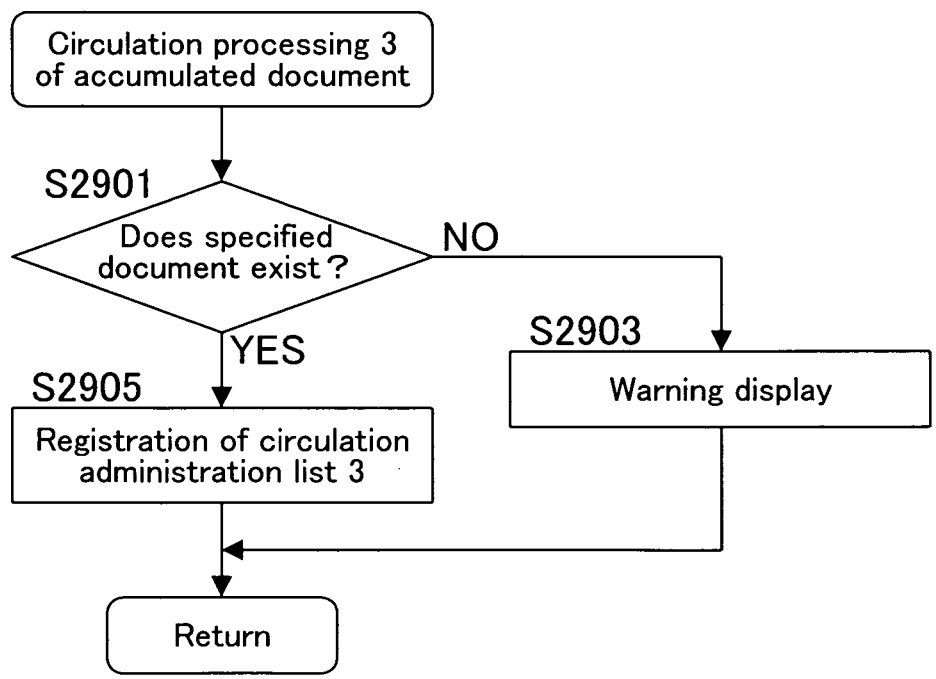
FIG. 29 is a flowchart showing circulation processing 3 of an accumulated document to be executed by the server apparatus.

Now, the processing of the image forming apparatus received a circulation request will be explained with reference to the flowchart shown in FIG. 29.

The image forming apparatus received the print data initially confirms whether there exists the designated accumulated document (Step S2901). If no designated accumulated document exists (NO at Step S2901), the fact is displayed on the operation panel 130 (Step S2903), and this processing terminates. If the designated accumulated document exists (YES at Step S2901), the circulation information is registered in the aforementioned circulation administration list 3 (Step S2903), and this processing terminates.

[2-4] Processing Completion Processing 3 of Accumulated Document

Figure 23:
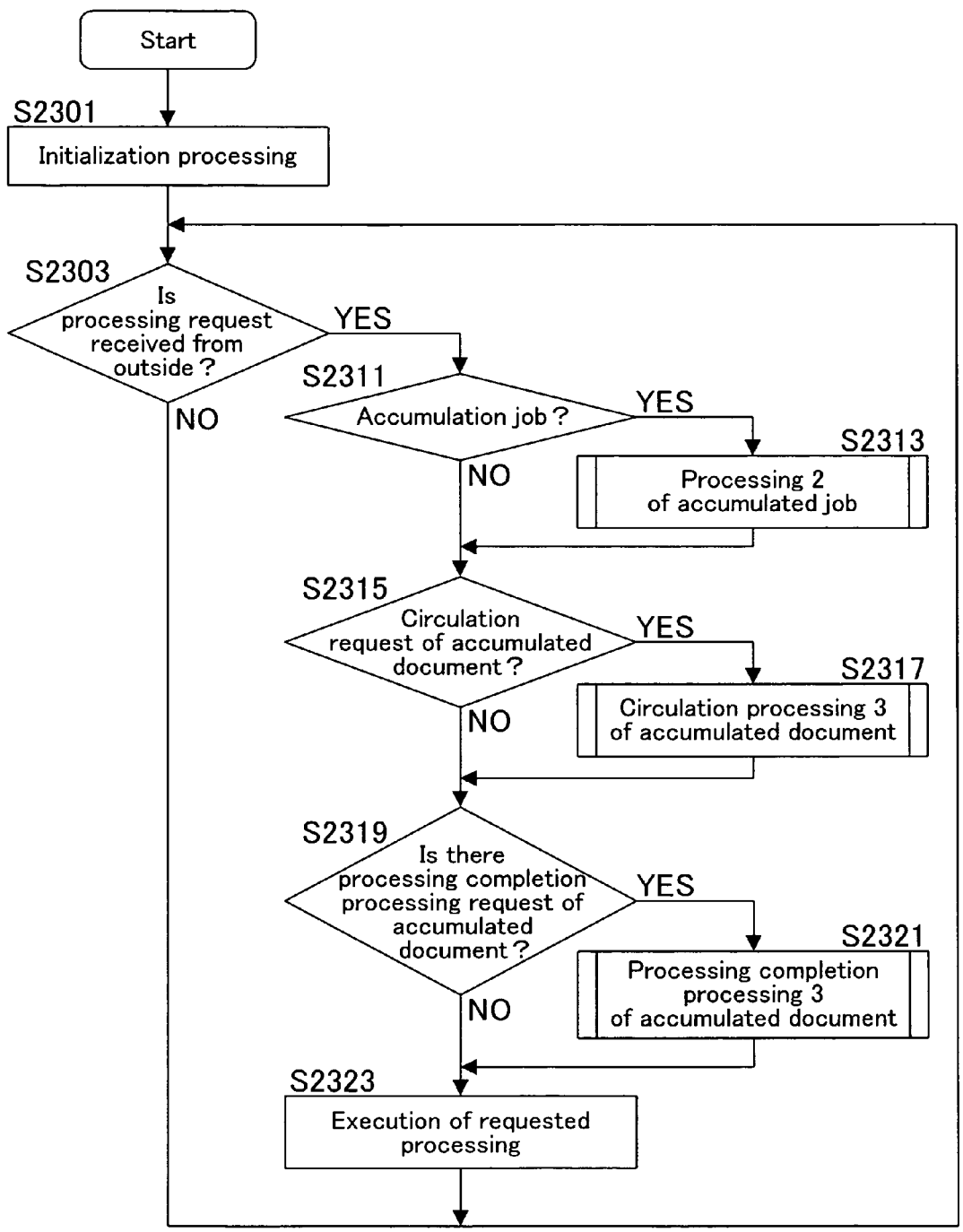
FIG. 23 is a flowchart showing overall processing to be executed by the server apparatus.
Figure 24:
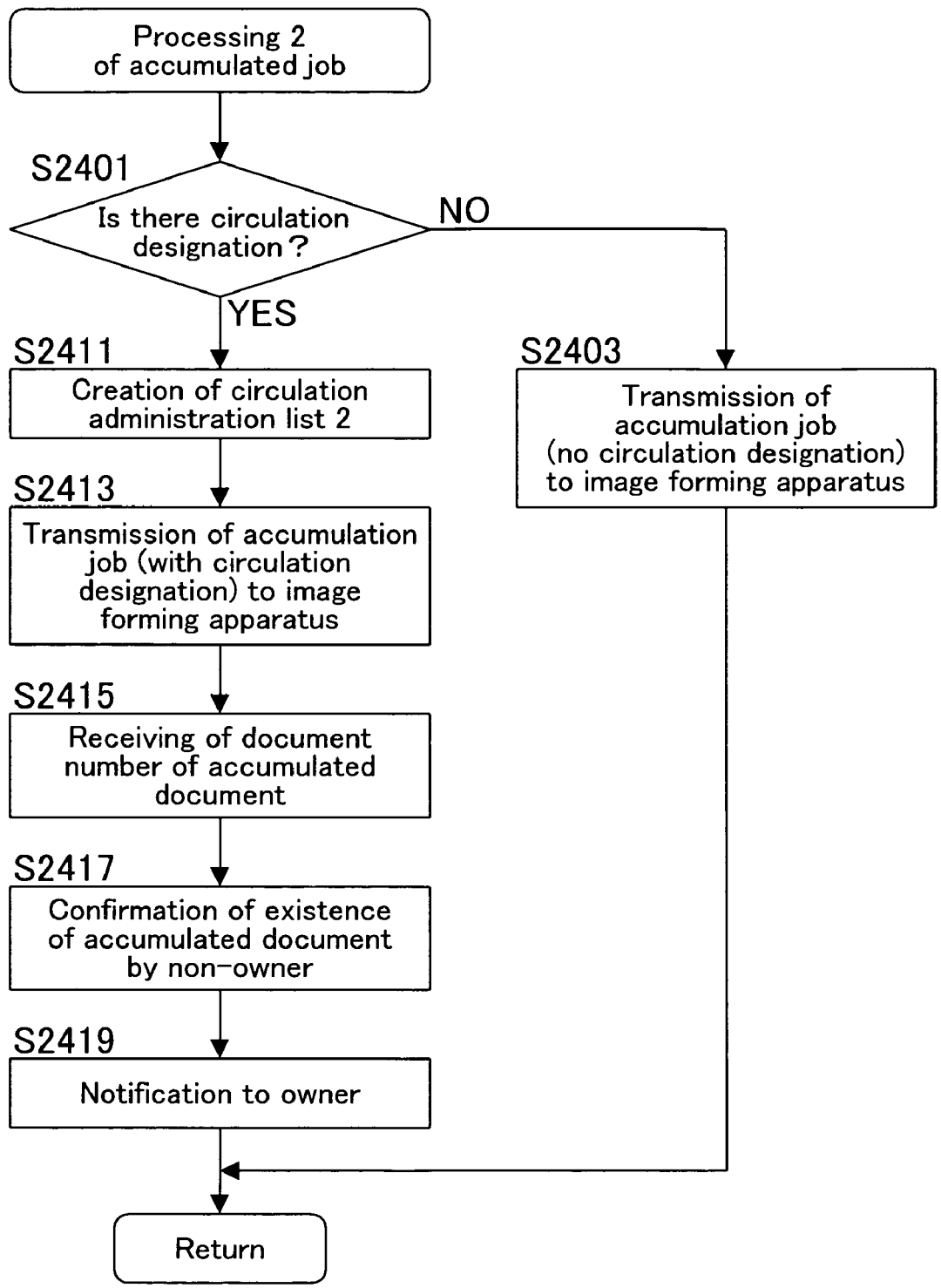
FIG. 24 is a flowchart showing accumulation job processing 2 to be executed by the server apparatus.
Figure 30:
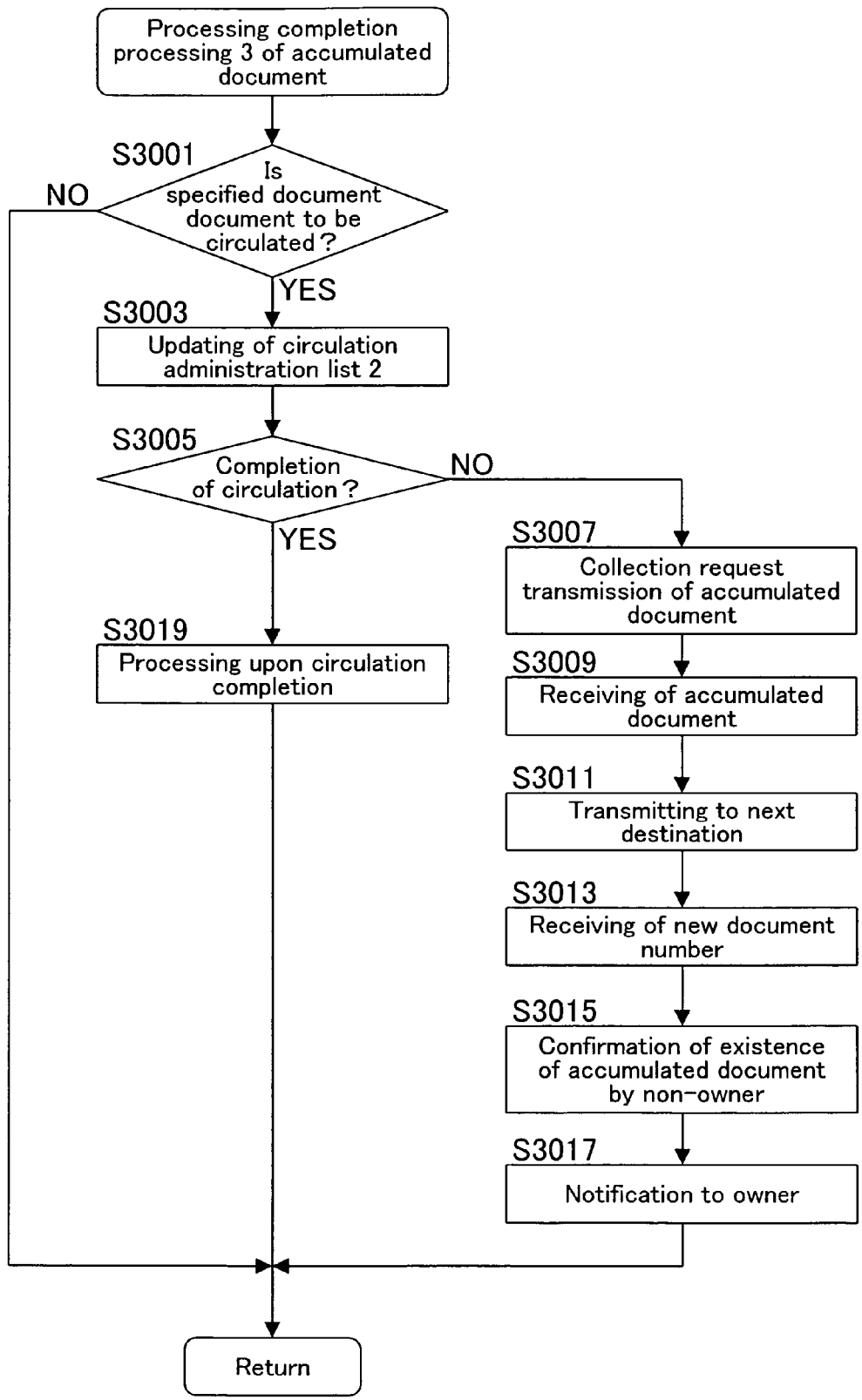
FIG. 30 is a flowchart showing processing completion processing 3 to be executed by the server apparatus.

Next, Step S2321 in FIG. 23 (processing completion processing 3 of an accumulated document) will be detailed based on the flowchart shown in FIG. 30. The processing completion of an accumulated document is requested by a user processed a circulation document moved into his/her private box, for example.

The terminal device 2 obtains a list of documents which is being circulated (hereinafter, "accumulated document-in-circulation list") from the server apparatus 4, and displays it on the monitor. A user operating the terminal device 2 selects a document that the processing is to be terminated from the accumulated document-in-circulation list.

Based on the user's operation, the terminal device 2 transmits processing completion request of the accumulated document including at least the following parameter designation to the sensor apparatus 4.

ENDOFPROCESSING="10. 192. 168. 1, 123, 1001"

[ENDOFPROCESSING="10. 192. 168. 1, 123, 1001"] specifies the accumulated document whose processing is to be terminated in the form of "IP address of the image forming apparatus, box number, document number."

Receiving the print data, the sensor apparatus 4 discriminates whether the specified document is being circulated (Step S3001). If the specified document is not a document which is being circulated (NO at Step S3001), this processing terminates.

If the specified document is a document which is being circulated (YES at Step 3001), it is discriminated that the circulation processing by the user is completed, and the circulation administration list 2 is updated (Step S3003). That is, "done" is set in the processing completion flag section of the specified box in the circulation administration list 2, and the date and time when the processing completion processing request was received is set in the "circulation completion date and time" section.

Next, it is discriminated whether there exists a next circulation destination by referring the circulation administration list 2 (Step S3005).

If there is a next circulation destination (NO at Step S3005), initially, print data including only the following PJL is transmitted to the image forming apparatus 1-*a* in which a document is accumulated, and a collection of the accumulated document is requested (Step S3007).

```
% - 12345x@PJL
@PJL SET ENDOFPROCESSING = "123, 1001"
% - 12345X
```

[@PJL SET ENDOFPROCESSING="123, 1001"] specifies the accumulated document to be collected in the form of "box number, document number."

Thereafter, a document transmitted from the image forming apparatus 1-*a* in accordance with the collection requirement is received (Step S3009), and this received document is transmitted to the next circulation destination image forming apparatus (Step S3011). At this time, in the same manner as in the accumulation job processing 3, the print data specifying the following PJL is transmitted to the image forming apparatus 1-*b*.

```
% - 12345x@PJL
@PJL SET STOREINBOX = ON
@PJO SET BOXTOSTORE = 1506
@PJL SET BOXDOCPROP = "OK, NG, P1, 0 – 150, P2, 100 – 260,
P3 – P9, 0 – 260"
```

In cases where print conditions are received together with a document from the image forming apparatus 1-*a*, the print conditions are transmitted to the next circulation destination image forming apparatus together with the document.

Next, the document number of the accumulated document is received from the image forming apparatus 1-*b* (Step S3013), and the document number of the circulation administration list 2 is updated.

Next, it is confirmed from the box administration information transmitted from the image forming apparatus whether a document not accumulated by the owner of the private box himself/herself in the private box of the image forming apparatus to which the document is moved is accumulated (Step S3015). Then, a notice is given to the owner of the private box with an email or the like (Step S3017), and the processing terminates.

In the same manner as mentioned earlier, the contents of the notification are as follows. In cases where a document not accumulated by the owner of the private box itself is not accumulated, the contents of the notification are contents for notifying that a circulation document is moved. In cases where a document not accumulated by the owner of the private box itself is accumulated, the contents of the notification are the contents of both the fact and the movement of a circulation document.

It can be constituted such that a list of documents which have not been used for a long time in an accumulated state (neither read nor printed) is notified simultaneously with a circulation notification.

On the other hand, if no further circulation destination exists (NO at Step S3005), processing upon circulation completion is executed (Step S3019). This processing upon circulation completion includes, e.g., deletion of accumulated documents and notification of circulation to a previously specified destination. Such processing upon circulation completion can prevent circulation documents from being left for a long time beyond necessity.

Figure 31:
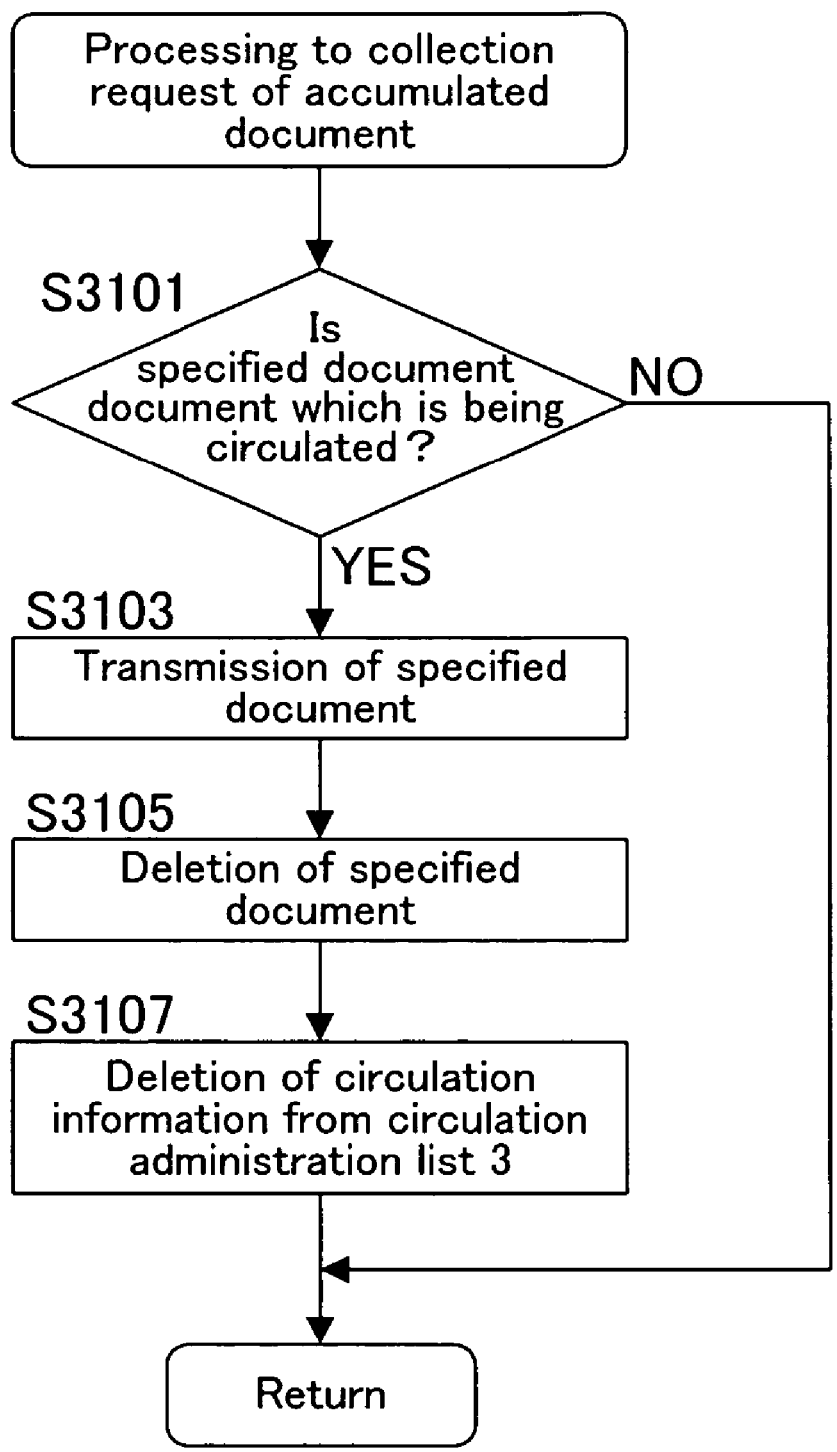
FIG. 31 is a flowchart showing processing to a collection request of an accumulated document to be executed by the image forming apparatus.

On the other hand, the processing of the image forming apparatus 1-*a* received the processing completion request will be explained with reference to the flowchart shown in FIG. 31.

The image forming apparatus 1-*a* received the processing completion request initially confirms whether the specified document is a document which is being circulated (Step S3101). Whether the document is being circulated is discriminated whether the document specified in the list is registered by referring to the circulation administration list 3.

If the specified document is not a document which is is being circulated (NO at Step S3101), this processing terminates. On the other hand, if the specified document is a document which is being circulated (YES at Step S3101), the specified document is initially transmitted to the server apparatus 4.

At this time, it can be constituted such that print conditions optimal to the image forming apparatus 1-*a* is transmitted to the server apparatus 4 together with the document.

The print conditions can be stored in the device in advance, and it is also possible to store plural print conditions depending on the option mounting status. For example, both side printing is set as print conditions in cases where a both-side unit is equipped, and single side printing is set as print conditions in cases where no both-side unit is equipped.

It can be more preferably constituted such that a user can transmit document together with its print conditions for circulating a document and register them. By constituting that optimal print conditions on each image forming apparatus are circulated together with a document, a user can easily print the document under the optimal print conditions without recognizing them.

Subsequently, the specified document is deleted from the box (Step S3105), and the circulation information of this document is deleted from the circulation administration list 3.

Figure 26:
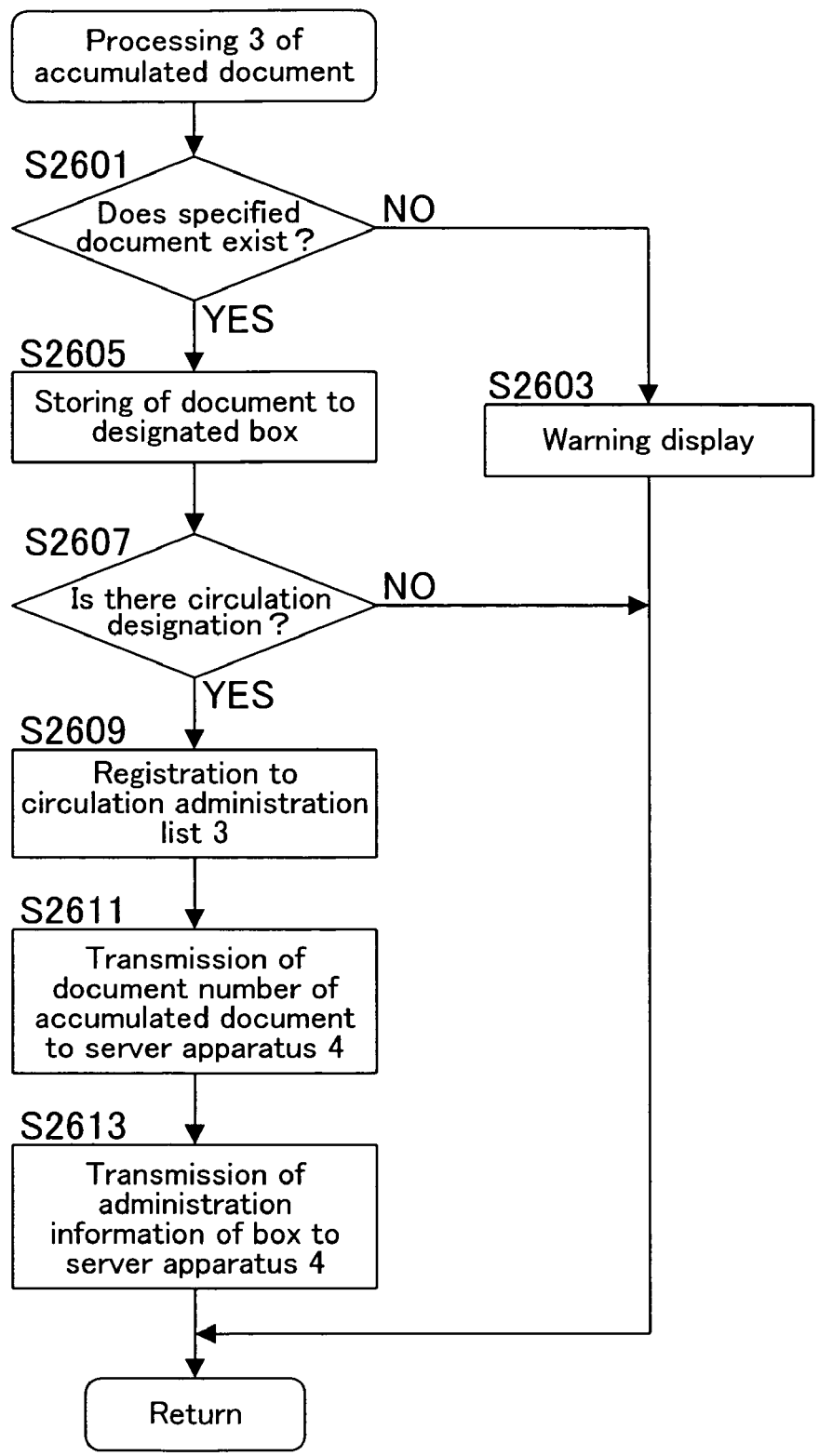
FIG. 26 is a flowchart showing accumulation job processing 3 to be executed by an image forming apparatus as a document processing apparatus used in the system shown in FIG. 19.

The processing of the image forming apparatus 1-*b* which is a new circulation destination is the same as the accumulate job processing 4 explained using the flowchart shown in FIG. 26. Therefore, cumulative explanation will be omitted here.

[2-5] Output Processing of Accumulated Document

Figure 32:
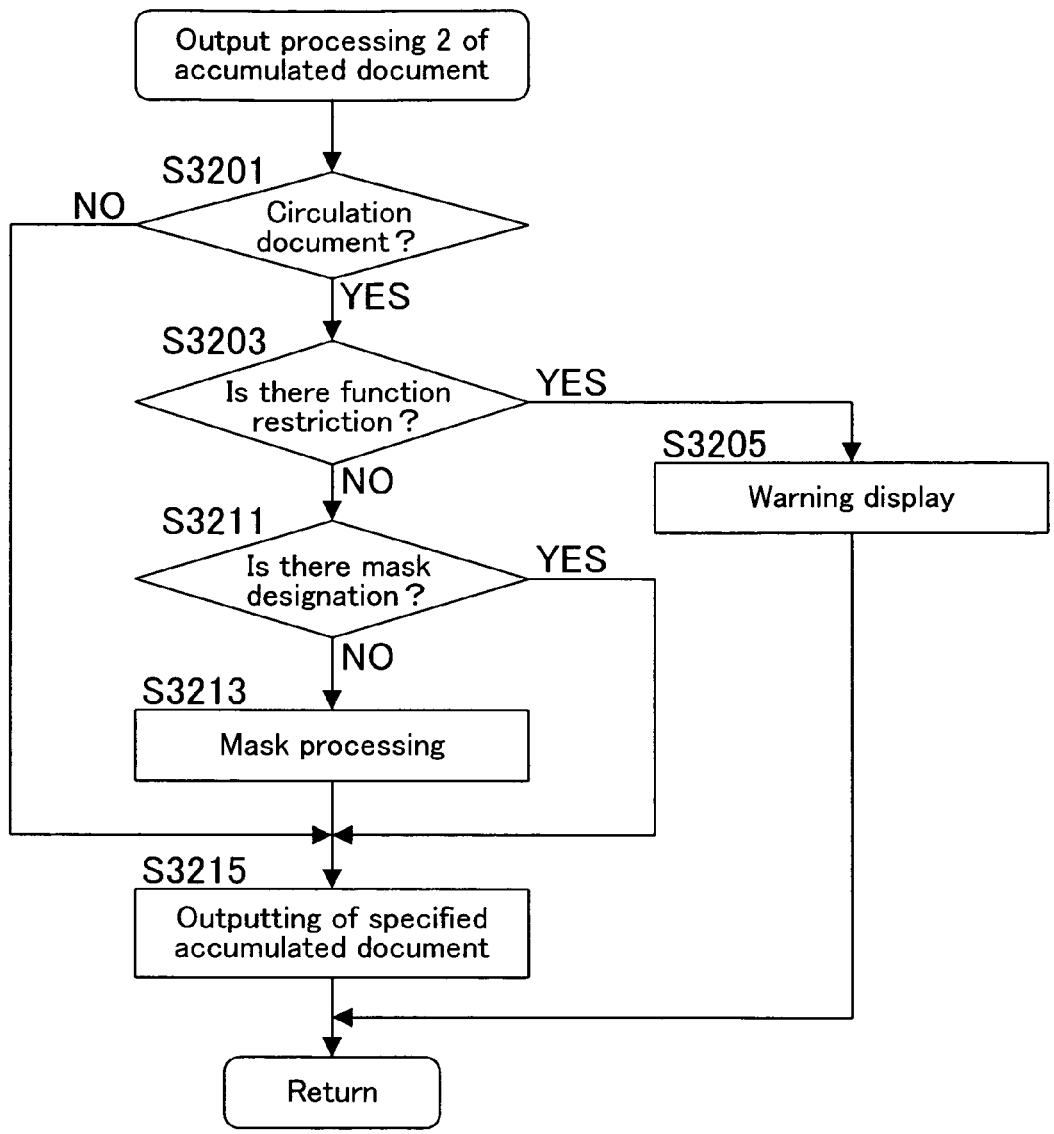
FIG. 32 is a flowchart showing accumulated document output processing 2 to be executed by the image forming apparatus.

The output processing of an accumulated document at the image forming apparatus 1-*x*(x:1-*n*) will be detailed based on the flowchart shown in FIG. 32.

In the case of outputting an accumulated document, a user specifies an accumulated document to be outputted by manipulating the operation panel 130. If the specified accumulated document is a normal accumulated document which is not a circulation document (NO at Step S3201), the specified accumulated document is outputted (Step S3215), and the output processing of the accumulated document terminates.

Whether the specified accumulated document is a circulation document is discriminated based on whether the specified accumulated document is registered in the circulation administration list 3.

If the specified document is a circulation document (YES at Step S3201), by referring to the "function restriction" section in the circulation administration list 3, it is confirmed whether the output function to be executed is allowed (Step S3203). If the execution of the output function to be executed is prohibited (YES at Step S3203), a warning that the execution of the specified function is prohibited is displayed on the operation panel 130 (Step S3205), and the output processing of the accumulated document terminates.

If the execution of the function to be executed is allowed (NO at Step S3203), by referring to the "Mask area" of the circulation administration list 3, it is confirmed whether the mask area is specified (Step S3211). If the mask area is not specified, the routine proceeds to Step S3215. If the mask area is specified (YES at Step S3211), the specified mask area is masked (Step S3213). This masking processing is processing of marking out a specified area or replacing with a prescribed mark such as an asterisk "*."

Thereafter, the masked accumulated document is printed or transmitted to an external device (Step S3215), and this processing terminates.

As explained above, in this embodiment, function execution restriction or mask specification is performed. Therefore, for example, in cases where a circular document is a highly-confidential document, the document can be circulated while keeping the security.

As explained above, in the image forming system according to the embodiment 2, when it is discriminated that a document to be accumulated in a private box of a certain image forming apparatus or a document already accumulated is moved to the specified private box of the specified image forming apparatus and that the processing of the document is completed, this document is moved to the next private destination private box.

Thus, a circulation document is circulated in the specified order. Therefore, it becomes possible to circulate one document in order to finish the document while editing, which is very convenient.

Furthermore, when a document is moved to a circulation destination private box, a notice of the circulation is given to the private box owner. Therefore, the private box owner can recognize that a circulation document is moved to his/her private box immediately. This enables the private box owner to execute necessary processing and circulate it to the next circulation destination, which shortens the time required for the document circulation.

In addition to the notice of the circulation, in cases where a document not accumulated by the owner of the private box by himself/herself is accumulated, the fact is also notified to the owner, which also facilitates quick processing required to the document.

Furthermore, since it is constituted that a document is circulated using private boxes, it becomes possible to secure the security during the circulation. Furthermore, since the circulation order is administered in the server apparatus, no delay from a certain circulation destination to the next circulation destination would occur.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example;" and "NB" which means "note well."

What is claimed is:

1. A document processing apparatus provided with boxes for storing various information, comprising:
   a storing device having the boxes as divided storing areas, the boxes including at least a private box having a box function of allowing an access from a specific user or group; and a notification portion configured such that when a document is moved in or a new document is accumulated in the private box in the storing device, a first fact that the document is moved in or the new document is accumulated in the private box in the storing device is notified to the owner of the private box, wherein if a document not accumulated by the owner has been accumulated in the private box in the storing device when the first fact is notified, the notification portion also notified the owner a second fact that the document not accumulated by the owner has been accumulated in the private box in the storing device with the first fact.

2. The document processing apparatus as recited in claim 1, further comprising:

a circulation document selecting portion configured to select a document to be circulated from documents already accumulated in the private box;

a circulation destination selecting portion configured to select circulation destination private boxes to which the document selected by the circulation document selecting portion is to be circulated;

a circulation order specifying portion configured to specify a circulation order among the private boxes selected by the circulation destination selecting portion;

a circulation list storing portion configured to store a document identification number of a document selected by the circulation document selecting portion and the circulation order specified by the circulation order specifying portion;

a document processing completion discriminating portion configured to discriminate whether processing of the document accumulated in the private box is completed; and an accumulated document moving portion configured to move the document to a private box listed as a next order in the circulation order stored in the circulation list storing portion if the document identification number of the document is stored by the circulation list storing portion when the document processing completion discriminating portion discriminates the processing of the document is completed, wherein a notification by the notification portion to the owner of the private box is made when the document is moved to a private box listed as the next order by the accumulated document moving portion.

3. The document processing apparatus as recited in claim 1, further comprising:

a first accumulation deadline setting portion configured to set a first accumulation deadline of the accumulated document to all of the boxes of the document processing apparatus;

a second accumulation deadline setting portion configured to set a second accumulation deadline to the document to be moved to the private box;

a priority accumulation deadline selecting portion configured to select which of the first accumulation deadline set by the first accumulation deadline setting portion and the second accumulation deadline set by the second accumulation deadline setting portion is to be placed priority;

a deadline-expired document processing portion configured to set processing to be executed on the accumulated document when the accumulation deadline selected by the priority accumulation deadline selecting portion passes; and a control portion configured to execute processing set by the deadline-expired document processing portion when a document is accumulated after the accumulation deadline selected by the priority accumulation deadline selecting portion.

4. The document processing apparatus as recited in claim 3, wherein the processing set by the deadline-expired document processing portion is any one of deletion of a deadline-expired document, warning to the box owner and forcible circulation to a next circulation destination.

5. The document processing apparatus as recited in claim 2, further comprising a function restriction setting portion configured to set restriction of a function executable to the circulation document every circulation destination box.

6. The document processing apparatus as recited in claim 2, further comprising a mask area setting portion configured to set a mask area for prohibiting an output to the circulation document every circulation box.

7. A document processing system in which a plurality of document processing apparatuses provided with boxes for storing various information, the boxes including at least a private box having a box function of allowing an access from a specific user or group, and a server apparatus are connected via a network to exchange various information, wherein the server apparatus is provided with a notification portion configured such that when a document is moved in or a new document is accumulated in the private box, a first fact that the document is moved in or the new document is accumulated in the private box is notified to the owner of the private box, wherein if a document not accumulated by the owner has been accumulated in the private box when the first fact is notified, the notification portion also notified the owner a second fact that the document not accumulated by the owner is accumulated in the private box with the first fact.

8. The document processing system as recited in claim 7, wherein the server apparatus further comprises:

a circulation destination selecting portion configured to select one or more circulation destination private boxes per one circulation destination among private boxes of the plurality of document processing apparatuses as circulation destinations to which the document to be accumulated in a private box of a certain document processing apparatus or the document selected from the already accumulated documents is circulated;

a circulation order specifying portion configured to specify a circulation order among the circulation destinations selected by the circulation destination selecting portion;

a circulation list storing portion configured to store a document identification number of the document, the private box of each circulation destination selected by the circulation document selecting portion and the circulation order specified by the circulation order specifying portion;

a processing completion discriminating portion configured to discriminate whether processing of the document accumulated in the private box is completed;

an accumulation destination deciding portion configured to decide a private box in which the document is to be accumulated subsequently, based on at least each circulation destination private box stored in the circulation list storing portion and the circulation order, when it is discriminated that processing of the document is completed by the processing completion discriminating portion; and a document moving portion configured to move the document to the private box decided by the accumulation destination deciding portion, wherein a notification by the notification portion to the owner of the private box is made when the document is moved to a private box listed as a next order by the document moving portion.

9. The document processing system as recited in claim 8, wherein the server apparatus further comprises a function restriction setting portion configured to set restriction of a function executable to the circulation document every circulation destination box.

10. The document processing system as recited in claim 8, further comprising a mask area setting portion configured to set a mask area for prohibiting an output to the circulation document every circulation box.

11. A nontransitory recording medium in which document processing program is stored for executing a computer of a document processing apparatus provided with boxes for storing various information, the boxes including at least a private box having a box function of allowing an access from a specific user or group,
wherein the program makes the computer execute:
a step of giving a first notification that a document is moved in or a new document is accumulated in the private box when the document is moved in or the new document is accumulated in the private box, to the owner of the private box, and
also giving a second notification that a document not accumulated by the owner has been accumulated in the private box if the document not accumulated by the owner has been accumulated in the private box when the first notification is given, to the owner of the private box.

12. The recording medium as recited in claim 11, wherein the program makes the computer execute:
a step of selecting a document to be circulated from documents already accumulated in the private box;
a step of selecting circulation destination private boxes to which the selected document is to be circulated;
a step of specifying a circulation order among the selected private boxes;
a step of storing a document identification number of the selected document and the specified circulation order in a storing portion;
a step of discriminating whether processing of the document accumulated in the private box is completed; and
a step of moving the document to a private box listed as a next order among the stored circulation order if the document is a document whose document identification number is stored in the storing portion when it is discriminated that the processing of the document is completed;
wherein at the step of giving the first notification, the first notification to the owner of the private box is made when the document is moved to the private box listed as the next order.

13. The recording medium as recited in claim 12, wherein the program makes the computer execute:
a step of setting a first accumulation deadline of the accumulated document over all of the boxes of the document processing apparatus;
a step of setting a second accumulation deadline to the document to be moved to the private box;
a step of selecting which of the first accumulation deadline and the second accumulation deadline is to be placed priority;
a step of setting processing to be executed on the accumulated document when the selected accumulation deadline passes; and a step of controlling so as to execute the set processing when a document is accumulated after the selected accumulation deadline.

14. The recording medium as recited in claim 13, wherein the processing set to the deadline-expired document is any one of deletion of a deadline-expired document, warning to the box owner and forcible circulation to a next circulation destination.

15. The recording medium as recited in claim 12, wherein the program further makes the computer execute a step of setting restriction of a function executable to the circulation document every circulation destination box.

16. The recording medium as recited in claim 12, wherein the program further makes the computer execute a step of setting a mask area for prohibiting an output to the circulation document every circulation box.

17. A nontransitory recording medium in which document processing program is stored for executing a computer of a server apparatus in a document processing system in which a plurality of document processing apparatuses provided with boxes for storing various information, the boxes including at least a private box having a box function of allowing an access from a specific user or group, and the server apparatus are connected via a network to exchange various information,
wherein the program makes the computer execute:
a step of giving a first notification that a document is moved in or a new document is accumulated in the private box when the document is moved in or the new document is accumulated in the private box, to the owner of the private box, and
also giving a second notification that a document not accumulated by the owner has been accumulated in the private box if the document not accumulated by the owner has been accumulated in the private box when the first notification, to the owner of the private box.

18. The recording medium as recited in claim 17, wherein the program makes the computer execute:
a step of selecting one or more private boxes per one circulation destination among private boxes of the plurality of document processing apparatuses, as circulation destinations to which a document to be accumulated in a private box of a certain document processing apparatus or a document selected from the already accumulated documents is circulated;
a step of specifying a circulation order among the selected circulation destinations;
a step of storing a document identification number of the document, each selected circulation destination private box and the specified circulation order in a storing portion;
a step of discriminating whether processing of the document accumulated in the private box is completed;
a step of deciding a private box in which the document is to be accumulated subsequently based on at least each circulation destination private box and circulation order stored in the storing portion when it is discriminated that the processing of the document is complete;
a step of moving the document to the decided private box,
wherein at the step of giving the first notification, the first notification to the owner of the private box is made when the document is moved to a private box listed as the next order.

19. The recording medium as recited in claim 18, wherein the program further makes the computer execute a step of setting restriction of a function executable to the circulation document every circulation destination box.

20. The recording medium as recited in claim 18, wherein the program further makes the computer execute a step of setting a mask area for prohibiting an output to the circulation document every circulation box.

21. A document processing apparatus provided with boxes for storing various information in a sorted manner, comprising:

- a storing device having the boxes as divided storing areas, the boxes including at least a private box having a box function for allowing an access request from a specific user and/or group;
- a controller for storing various information in a specified box among the boxes; and
- a notification unit configured such that when a document is moved in or a new document is accumulated in the private box in the storing device, the owner of the private box is notified of a first fact that the document is moved in or the new document is accumulated in the private box in the storing device, wherein if a document not accumulated by the owner has been accumulated in the private box in the storing device when the first fact is notified, the notification portion also notifies the owner a second fact that the document not accumulated by the owner has been accumulated in the private box in the storing device with the first fact.

* * * * *